United States Patent
Hart et al.

(10) Patent No.: US 11,597,144 B2
(45) Date of Patent: Mar. 7, 2023

(54) SYSTEMS, DEVICES, AND METHODS FOR FABRICATING COLLOIDAL SOLIDS

(71) Applicant: Massachusetts Institute of Technology, Cambridge, MA (US)

(72) Inventors: Anastasios John Hart, Waban, MA (US); Justin Douglas Beroz, Cambridge, MA (US); Alvin Thong Lip Tan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1043 days.

(21) Appl. No.: 16/261,535

(22) Filed: Jan. 29, 2019

(65) Prior Publication Data
US 2019/0232557 A1    Aug. 1, 2019

Related U.S. Application Data

(60) Provisional application No. 62/623,248, filed on Jan. 29, 2018.

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/106* (2017.08); *B29C 64/20* (2017.08);
(Continued)

(58) Field of Classification Search
CPC .................................................. B01J 13/0086
See application file for complete search history.

(56) References Cited

U.S. PATENT DOCUMENTS

| | | | |
|---|---|---|---|
| 9,487,002 B2 | 11/2016 | Rogers et al. | |
| 2015/0155186 A1 | 6/2015 | Brunschwiler et al. | |
| 2019/0276688 A1* | 9/2019 | Seol | C09D 11/033 |

FOREIGN PATENT DOCUMENTS

CN    104999180 B    11/2016

OTHER PUBLICATIONS

Kudrolli et al. "Building Designed Granular Towers One Drop at a Time." Physical Review Letters. 2011. (Year: 2011).*
(Continued)

*Primary Examiner* — Joseph S Del Sole
*Assistant Examiner* — Ariella Machness
(74) *Attorney, Agent, or Firm* — Barnes & Thornburg LLP

(57) ABSTRACT

Disclosed are methods for building colloidal solids by precipitation from a liquid bridge using a needle through which a colloidal particle suspension is dispensed onto a substrate in a temperature-controlled environment. The substrate can rest on a motion-controlled stage, and freeform shapes can be built by coordinating the motion of the stage with the rate of dispense of colloidal particle suspension. Aspects include a scaling law that governs the rate of assembly and a direct-write colloidal assembly process that combines self-assembly with direct-write 3D printing, and can be used to build exemplary freestanding structures using a diverse materials, such as polystyrene, silica and gold particles. Additionally, disclosed are methods for predicting and eliminating cracking by a geometric relationship between particle size and structure dimensions, enabling the production of macroscale, crack-free colloidal crystals.

19 Claims, 15 Drawing Sheets

(51) Int. Cl.
| | |
|---|---|
| B29C 64/106 | (2017.01) |
| C09D 5/22 | (2006.01) |
| C09D 1/00 | (2006.01) |
| B33Y 70/00 | (2020.01) |
| B33Y 50/02 | (2015.01) |
| B29C 64/20 | (2017.01) |
| B29C 64/393 | (2017.01) |
| B33Y 30/00 | (2015.01) |

(52) U.S. Cl.
CPC ............ B29C 64/393 (2017.08); B33Y 10/00 (2014.12); B33Y 30/00 (2014.12); B33Y 50/02 (2014.12); B33Y 70/00 (2014.12); C09D 1/00 (2013.01); C09D 5/22 (2013.01)

(56) References Cited

OTHER PUBLICATIONS

Lower "7.10: Colloids and their Uses"—Chemistry LibreTexts (Last Updated: Mar. 3, 2021) (Year: 2021).*
Beroz et al. "Direct-Write Self-Assembly of 3D Colloidal Microstructures." Solid-State Sensors, Actuators, and Microsystems Workshop. 2012 (Year: 2012).*
Beroz et al. "Four degree of freedom liquid dispenser for direct write capillary self-assembly with subnanoliter precision." Review of Scientific Instruments. 2012. (Year: 2012).*
Weitz et al. "Flow and Fracture in Drying Nanoparticle Suspensions." Physical Review Letters. 2003. (Year: 2003).*
Goehring et al. "Solidification and Ordering during Directional Drying of a Colloidal Dispersion", Langmuir, 26(12), 9269-9275, 2010. (Year: 2010).*
Jaworski et al. "Progression in the Fountain Pen Approach: From 2D Writing to 3D Free-Form Micro/Nanofabrication", Small, 13, 1600137, 2017. (Year: 2017).*
Ahn, et al., "Omnidirectional Printing of Flexible, Stretchable, and Spanning Silver Microelectrodes," Science, vol. 323, Issue 5921, pp. 1590-1593, 2009.
Beroz, et al., "Four degree of freedom liquid dispenser for direct write capillary self-assembly with sub-nanoliter precision," Review of Scientific Instruments, vol. 83, e015104, 2012.
Blanco, et al., "Large-scale synthesis of a silicon photonic crystal with a complete three-dimensional bandgap near 1.5 micrometres," Nature, vol. 405, pp. 437-440, 2000.
Bodnarchuk, et al., "Large-Area Ordered Superlattices from Magnetic Wüstite/Cobalt Ferrite Core/Shell Nanocrystals by Doctor Blade Casting," ACS Nano, vol. 4, No. 1, pp. 423-431, 2010.
Bonderer, et al., "Bioinspired design and assembly of platelet reinforced polymer films," Science, vol. 319, pp. 1069-1073, 2008.
Calvert, P, "Inkjet Printing for Materials and Devices," Chemistry of Materials, vol. 13, Issue 10, pp. 3299-3305, 2001.
Cheng, et al., "Observation and tuning of hypersonic bandgaps in colloidal crystals," Nature Materials, vol. 5, pp. 830-836, 2006.
Chopin, et al., "Building Designed Granular Towers One Drop at a Time," Physical Review Letters, vol. 107, e208304, 2011.
Denkov, et al., "Mechanism of formation of two-dimensional crystals from latex particles on substrates," Langmuir, vol. 8, Issue 12, pp. 3183-3190, 1992.
Derby, B, "Inkjet Printing of Functional and Structural Materials: Fluid Property Requirements, Feature Stability, and Resolution," Annual Review of Materials Research, vol. 40, pp. 395-414, 2010.
Dimitrov, et al., "Continuous Convective Assembling of Fine Particles into Two-Dimensional Arrays on Solid Surfaces," Langmuir, vol. 12, Issue 5, pp. 1303-1311, 1996.
Dufresne, et al., "Flow and Fracture in Drying Nanoparticle Suspensions," Physical Review Letters, vol. 91, e224501, 2003.
Galisteo-López, et al., "Self-Assembled Photonic Structures," Advanced Materials, vol. 23, Issue 1, pp. 30-69, 2011.
Ganapathy, et al., "Direct Measurements of Island Growth and Step-Edge Barriers in Collodal Epitaxy," Science, vol. 327, pp. 445-448, 2010 (5 pages).
Goehring, et al., "Plasticity and Fracture in Drying Colloidal Films," Physical Review Letters, vol. 110, e024301, 2013.
Jiang, et al., "Single-Crystal Colloidal Multilayers of Controlled Thickness," Chemistry of Materials, vol. 11, Issue 8, pp. 2132-2140, 1999.
Joo, et al., "Ordered nanoporous arrays of carbon supporting high dispersions of platinum nanoparticles," Nature, vol. 412, pp. 169-172, 2001.
Joshi, et al., "Estimation of drying length during particle assembly by convective deposition," Journal of Colloid and Interface Science, vol. 496, pp. 222-227, 2017.
Kestin, et al., "Viscosity of Liquid Water in the Range -8° C. to 150° C.," Journal of Physical and Chemical Reference Data, vol. 7, p. 941, 1978.
Lee, et al., "All-Nanoparticle Thin-Film Coatings," Nano Letters, vol. 6, Issue 10, pp. 2305-2312, 2006.
Lee, et al., "Tunable Inverse Opal Hydrogel pH Sensors," Advanced Materials, vol. 15, Issue 7-8, pp. 563-566, 2003.
Lin, et al., "A Study of the Equilibrium Surface Tension and the Critical Micelle Concentration of Mixed Surfactant Solutions," Langmuir, vol. 15, Issue 13, pp. 4370-4376, 1999.
Lin, et al., "Measuring nonlinear stresses generated by defects in 3D colloidal crystals," Nature Materials, vol. 15, pp. 1172-1176, 2016.
Macfarlane, et al., "Nanoparticle Superlattice Engineering with DNA," Science, vol. 334, Issue 6053, pp. 204-208, 2011.
Mishra, et al., "High-speed and drop-on-demand printing with a pulsed electrohydrodynamic jet," Journal of Micromechanics and Microengineering, vol. 20, No. 9, e095026, 2010.
Mitarai, et al., "Wet Granular Materials," Advances in Physics, vol. 55, Issue 1-2, pp. 1-45, 2006.
Míguez Garcia, et al., "Photonic crystal properties of packed submicrometric $SiO_2$ spheres," Applied Physics Letters, vol. 71, Issue 9, pp. 1148, 1997.
Park, et al., "Nanoscale, Electrified Liquid Jets for High-Resolution Printing of Charge," Nano Letters, vol. 10, Issue 2, pp. 584-591, 2010.
Philipse, et al., "Liquid Permeation (and Sedimentation) of Dense Colloidal Hard-Sphere Packings," Journal of Colloid and Interface Science, vol. 159, Issue 1, pp. 96-107, 1993.
Podsiadlo, et al., "Ultrastrong and Stiff Layered Polymer Nanocomposites," Science, vol. 318, pp. 80-83, 2007.
Prevo, et al., "Controlled, Rapid Deposition of Structured Coatings from Micro- and Nanoparticle Suspensions," Langmuir, vol. 20, Issue 6, pp. 2099-2107, 2004.
Routh, A, "Drying of thin colloidal films," IOP Science—Reports on Progress in Physics, vol. 76, No. 4, e046603, 2013.
Schall, et al., "Visualization of Dislocation Dynamics in Colloidal Crystals," Science, vol. 305, Issue 5692, pp. 1944-1948, 2004.
Scheel, et al., "Morphological clues to wet granular pile stability," Nature Materials, vol. 7, pp. 189-193, 2008.
Smay, et al., "Colloidal Inks for Directed Assembly of 3-D Periodic Structures," Langmuir, vol. 18, Issue 14, pp. 5429-5437, 2002.
Valden, et al., "Onset of Catalytic Activity of Gold Clusters on Titania with the Appearance of Nonmetallic Properties," Science, vol. 281, Issue 5383, pp. 1647-1650, 1998.
Vlasov, et al., "On-chip natural assembly of silicon photonic bandgap crystals," Nature, vol. 414, pp. 289-293, 2001.
Vogel, et al., "Color from hierarchy: Diverse optical properties of micron-sized spherical colloidal assemblies," Proceedings of the National Academy of Sciences of the United States of America, vol. 112, Issue 35, pp. 10845-10850, 2015.
Zhang, et al., "Three-Dimensional Metal Scaffold Supported Bicontinuous Silicon Battery Anodes," Nano Letters, vol. 12, Issue 6, pp. 2778-2783, 2012.
Beroz et al., "Direct-Write Self-Assembly of 3D Collodial Microstructures", May 24, 2012 (6 pages).
PCT International Search Report and Written Opinion, Appl. No. PCT/US19/15738, dated Apr. 15, 2019.

* cited by examiner

SYSTEMS, DEVICES, AND METHODS FOR FABRICATING COLLOIDAL SOLIDS

CROSS REFERENCE TO RELATED APPLICATION

The present application claims priority to and the benefit of U.S. Provisional Patent Application No. 62/623,248, filed Jan. 29, 2018, and titled "Direct-Write Freeform Colloidal Assembly," the contents of which is incorporated herein by reference in its entirety.

GOVERNMENT RIGHTS

This invention was made with Government support under Grant No. CMMI-1346638 awarded by the National Science Foundation. The Government has certain rights in the invention.

FIELD

This disclosure relates to fabrication of colloidal solids using direct-write techniques.

BACKGROUND

Structural hierarchy—which involves the control of composition and form across length scales—is a powerful strategy for creating functional natural and synthetic materials. In natural materials, examples of hierarchical morphology can be found in, for instance: butterfly wings, which display intricate photonic effects, the xylem architecture of plants, which feature optimized mass transport, and the skeletal structure of sea sponges, which possess outstanding mechanical properties. Ordered assemblies of colloidal particles are attractive for technological applications because of their emergent properties, which arise from the size, composition, and ordering of the particles. Assemblies of colloidal particles exhibit unique optical, chemical, and mechanical properties based on, at least in part, particle geometry, composition, and arrangement, which enables tailored design of novel materials for diverse applications. However, typical evaporative particle assembly methods are limited to thin-film and thick-film crystal geometries. Furthermore, the formation of cracks during evaporation has impeded studies of macroscopic properties of colloidal crystals.

Methods to deposit and self-assemble ordered particle solids from suspension are typically limited to fabrication of films and patterns, and commonly utilize surface tension to confine particles against substrates. In contrast, direct-write methods to build 3D structures rely on cohesion between particles in high-density suspensions, which inhibits particle ordering. As a result, the fabrication of ordered colloidal solids as three dimensional macroscale shapes remains a challenge, which limits their bulk property characterization and their utility for applications.

Accordingly, there is a need for systems, devices, and methods that allow for colloidal solids to be produced in a more robust and reliable manner such that the colloidal solids have desirable configurations and structural integrity.

SUMMARY

Certain aspects of the present disclosure enable direct-writing of colloidal assemblies and/or solids, as a new fabrication technique that combines the principles and advantages of evaporative colloidal assembly with the versatility and scalability of direct-write 3D printing. Certain embodiments enable both local control of particle organization and global control of the shape of the structure.

Certain aspects of the present disclosure provide for a direct-write method to build freeform colloidal solids by precipitation from a liquid bridge maintained at the orifice of a dispensing needle. The structures can exceed heights of 1 centimeter and aspect ratios of 10, and they can have polycrystalline particle ordering that induces structural color. Aspects include modeling the build rate of the solids structures and the condition for cracks to appear. Aspects include predicting and mitigating crack formation based on a geometric relationship between particle size and structure dimensions, which enables crack-free solids to be built. In some instances, the presence of cracks in freestanding solid geometries is counter to the established elastic fracture mechanics modeling framework for drying colloidal solids.

Certain aspects of the present disclosure provide for a versatile direct-write technique that enables the simultaneous control of composition, order, and macroscale structure of colloidal materials.

In certain aspects of the present disclosure colloidal solids (e.g., crystal structures) are constructed by first positioning a needle orifice of a dispensing component near the substrate and then dispensing the particle suspension to establish a liquid bridge. The liquid bridge is then maintained by continuous dispensing to balance the rate at which dispensed liquid is removed, such as by balancing the rate of water evaporation (e.g., approximately $10^{-2}$ µl/s). As particles accumulate into a colloidal solid (e.g., a colloidal crystal) at the base of the liquid bridge, the substrate can be retracted at a rate approximately equal to the rate of growth of the colloidal crystal. Particles can accumulate into a solid layer at the base of the liquid bridge due to a combination of evaporation-driven liquid flow and confinement due, at least in part, to the surface tension of the liquid. The substrate can then be retracted at a controlled rate approximately equal to the increase in layer thickness (e.g., 10 µm/s), which maintains the liquid bridge while precipitating a solid structure from its bottom, which can reach aspect ratios greater than 10. Construction can be terminated by halting particle suspension dispensing, which causes the liquid bridge to collapse. Further, the remaining liquid in the particle structure can evaporate or otherwise be removed. Coordinating additional degrees of freedom of substrate motion allows colloidal crystals to be constructed in freeform.

One exemplary method of fabricating a colloidal solid includes dispensing a colloidal particle suspension through an orifice of a dispensing component, towards a substrate, so as to establish and maintain a liquid bridge at the orifice of the dispensing component and precipitate a colloidal solid from a base of the liquid bridge. The liquid bridge extends between the dispensing component and one of the substrate or a precipitating portion of the colloidal solid. The colloidal particle suspension includes a liquid and colloidal particles having a size approximately in the range of about 1 nanometer to about 1 micrometer, and the colloidal solid including the colloidal particles. The method further includes removing at least a portion of the liquid from the dispensed colloidal particle suspension in a manner that causes the colloidal solid to include a crystal structure.

The method can further include moving the base of the liquid bridge in-plane, the base being in contact with the substrate, to form the colloidal solid on the substrate, the colloidal solid having an aspect ratio approximately less than about one, and controlling at least one of movement of the base of the liquid bridge or a rate at which the colloidal particle suspension is dispensed to achieve a desired thickness of the colloidal solid. In some embodiments, the method can include collapsing the liquid bridge to terminate precipitation of the colloidal solid.

The method can also include moving the liquid bridge over one or more layers of previously deposited colloidal particles of the colloidal solid a plurality of times to deposit one or more additional layers of colloidal particles that become part of the colloidal solid, thereby increasing a thickness of the colloidal solid. In some embodiments, the method can include moving the liquid bridge with respect to the substrate to form the colloidal solid, the colloidal solid having an aspect ratio approximately greater than about one. In some such instances, the aspect ratio is approximately greater than about ten.

In some embodiments the method can include adjusting at least one of a distance between the orifice of the dispensing component and the colloidal solid or a rate at which the colloidal particle suspension is dispensed to maintain continuity of the liquid bridge. In some such embodiments, the rate at which the colloidal particle suspension is dispensed can be approximately equal to an instantaneous rate at which the at least a portion of the liquid from the dispensed colloidal particle suspension is removed. Alternatively, or additionally, a rate at which the distance between the orifice of the dispensing component and the colloidal solid is adjusted can be approximately equal to a precipitation rate of the colloidal solid. Further alternatively, or additionally, adjusting a distance between the orifice of the dispensing component and the colloidal solid can include at least one of: (1) translating the dispensing component with respect to the substrate; (2) rotating the dispensing component with respect to the substrate; (3) translating the substrate with respect to the dispensing component; or (4) rotating the substrate with respect to the dispensing component.

In some embodiments removing at least a portion of the liquid from the dispensed colloidal particle suspension can further include evaporating at least a portion of the liquid from the dispensed colloidal particle suspension. In some such embodiments, evaporating at least a portion of the liquid from the dispensed colloidal particle suspension can further include heating at least one of the substrate, a bounding surface located above the substrate, or an environment surrounding the dispensed colloidal particle suspension. The bounding surface can be opposed to the substrate. Still further, the method can include controlling heating of the at least one of the substrate, the bounding surface, or the environment surrounding the dispensed colloidal particle suspension to maintain a spatially controlled temperature throughout the colloidal solid during the evaporating of the liquid. Alternatively, or additionally, removing at least a portion of the liquid from the dispensed colloidal particle suspension can include wicking at least a portion of the liquid from the dispensed colloidal particle suspension into the substrate and/or diffusing at least a portion of the liquid from the dispensed colloidal particle suspension into an ambient medium.

In some embodiments, the method can include controlling a rate at which the at least a portion of the liquid from the dispensed colloidal particle suspension is removed as a function of at least one of: (1) one or more sizes of the colloidal particles; (2) dimensions of a wet precipitated section of the colloidal solid; (3) geometry of the wet precipitated section of the colloidal solid; (4) a temperature of the at least one of the substrate, a bounding surface located above the substrate, or an environment surrounding the dispensed colloidal particle suspension; (5) a surface tension of the liquid; or (6) a viscosity of the liquid. The aforementioned bounding surface can be opposed to the substrate. In some embodiments, controlling a rate at which the at least a portion of the liquid from the dispensed colloidal particle suspension is removed can further include controlling an evaporation rate of the liquid to maintain the dimensions of the wet precipitated section to be smaller than $(a^2/A) \cdot g$ to prevent crack formation. In such embodiments, a is the particle size, A is the surface area of the wet precipitated section, and g is a dimensionless constant.

The method can further include sensing a configuration of the liquid bridge and, in view of the sensed configuration of the liquid bridge, adjusting at least one of the following to maintain the liquid bridge as continuous: (1) a rate at which the colloidal particle suspension is dispensed; or (2) a location of the substrate with respect to the orifice of the dispensing component. In some such instances, the sensing can include measuring a pressure of the colloidal suspension upstream of the orifice. Alternatively, or additionally, the sensing can include imaging the liquid bridge.

Another exemplary method of fabricating a colloidal solid includes dispensing a colloidal particle suspension through an orifice, towards a substrate, so as to establish a liquid bridge at the orifice and precipitate a colloidal solid from a base of the liquid bridge. The liquid bridge extends between the orifice and one of the substrate or a precipitating portion of the colloidal solid. The colloidal particle suspension includes a liquid and colloidal particles, and the colloidal solid includes the colloidal particles. The method further includes removing at least a portion of the liquid from the dispensed colloidal particle suspension in a manner that exerts a compressive force on the colloidal particles sufficient to assemble them into the colloidal solid by overcoming one or more electrical repulsion forces between the colloidal particles. The colloidal particles are of a sufficiently small size such that the one or more electrical repulsion forces between the colloidal particles at the base of the liquid bridge is greater than gravitational sedimentary forces between the colloidal particles.

In some embodiments of the method, removing the liquid to exert the compressive force can occur over a length of time that is sufficient to permit at least a portion of particles of the colloidal solid to settle into a crystal arrangement. Additional features from the first described exemplary method can be applied to the second exemplary method described herein, as can other features described throughout the present disclosure, without departing from the spirit of the present disclosure.

One exemplary system for fabricating a colloidal solid includes a stage, a dispensing component, and a controller. The stage is configured to support a substrate. The dispensing component is configured to deliver a flow of a colloidal particle suspension through an orifice of the dispensing component and towards the stage such that the colloidal particle suspension is delivered to at least one of the substrate, previously dispensed colloidal particle suspension, or colloidal particles from previously dispensed colloidal particle suspension. The colloidal particle suspension that the dispensing component is configured to deliver includes a liquid and colloidal particles having a size approximately in the range of about 1 nanometer to about 1 micrometer. The controller is configured to control a delivery of the colloidal particle suspension from the dispensing component to precipitate a colloidal solid on the substrate by adjusting at least one of: (1) a distance between the orifice of the dispensing component and the precipitated colloidal solid; or (2) an orientation between the orifice of the dispensing component and the precipitated colloidal solid. The adjustment is such that it maintains a liquid bridge at the orifice of the dispensing component, with the liquid bridge being disposed between the dispensing component and one of the substrate or a precipitating portion of the colloidal solid. At least one of the stage and the dispensing component is moveable with respect to the other.

The controller can be configured to control the delivery of the colloidal particle suspension from the dispensing component such that a rate at which the colloidal particle suspension is dispensed can be approximately equal to a rate of growth of the colloidal solid. In some embodiments, at least one of the stage or the dispensing component can be translatable in three axes with respect to the other. Alternatively, or additionally, at least one of the stage or the dispensing component can be rotatable in three axes with respect to the other. There can be up to six degrees of freedom with respect to the stage (or stages in some instances) or the dispensing coming (or dispensing components in some instances).

In some embodiments the system can include an evaporation system. The evaporation system can be configured to evaporate the liquid of the colloidal particle suspension after it has been dispensed from the dispensing component. In some such instances, the evaporation system can include a heating system, with the heating system being configured to heat the stage and/or a configuration of one or more temperature controlled surfaces configured to determine a spatial distribution of temperature for at least one of the substrate, the dispensing component, and/or an environment surrounding the dispensed colloidal particle suspension.

The system can include one or more sensors. The sensors can be configured to sense one or more parameters for use in determining a configuration of the liquid bridge. Further, the controller can be configured to receive the one or more parameters and adjust at least one of the following to maintain the liquid bridge as continuous: (1) a rate at which the colloidal particle suspension is dispensed, or (2) a location of the substrate with respect to the orifice of the dispensing component. In some such instances, the sensor(s) can include an imaging device arranged to observe the configuration of the liquid bridge. Alternatively, or additionally, the sensor(s) can include a pressure sensor arranged to sense a pressure of the colloidal particle suspension upstream of the orifice.

A person skilled in the art, in view of the present disclosures, will understand how the various features described above with respect to the exemplary methods, as well as features described throughout the present disclosure, can be incorporated into the exemplary system, without departing from the spirit of the present disclosure.

Dispensing a colloidal particle suspension through an orifice of a dispensing component and onto a substrate can include continuously dispensing the colloidal particle suspension at a rate approximately equal to a rate of evaporating the liquid.

The colloidal particles can include at least one of: metal, polymer, or ceramic. In some instances, the colloidal particles include a mixture of colloidal particles having two or more compositions.

The liquid of the colloidal suspension can includes two or more substances, and removing at least a portion of the liquid can include removing the two or more substances at different rates, with at least a portion of a first liquid of a first substance being removed to precipitate the colloidal solid, and at least a portion of a second liquid of a second substance being removed.

In some instances, colloidal particles are of a sufficiently small size such that electrical repulsion forces between particles of the colloidal solid at the base of the liquid bridge are greater than gravitational sedimentary forces such that a flow of liquid through the liquid bridge and into the precipitating colloidal solid delivers a supply of colloidal particles and exerts a compressive force on the supplied colloidal particles to assemble them into the colloidal solid.

In some instances, a maximum magnitude of the compressive force exerted on the supplied colloidal particles is based on a surface tension of the liquid at an outer surface of the precipitating colloidal solid.

In some instances, the crystal structure comprises at least one of a single crystal, a polycrystalline, or an amorphous.

Advantages and Improvements Over Existing Methods and Devices

Existing direct-write methods do not perform assembly of colloidal particles into colloidal crystals. In contrast, aspects of the present disclosure provide direct-write methods that are capable of ordering colloidal particles into a colloidal crystal by manipulation and coordination of one or more of dispense rate, evaporative flux (or, more generally, removal of a liquid), and/or stage motion. Aspects of the presently disclosed direct-write methods provide a freeform means to control the electrical, optical, and/or mechanical properties of colloidal crystals via particle ordering and/or fabricated crystal shape.

Prior art techniques have demonstrated direct-write of particles with 10 μm particles. Certain aspects of the present disclosure include the following non-obvious advancements over the prior art:

(1) Long range ordering of true colloidal particles. In previous techniques, 10 μm polystyrene particles were precipitated into conical and tower structures. At 10 μm, these particles were large enough that they sediment on their own without much ordering. Aspects of the present disclosure provide for the assembly of particles in true colloidal sizes, defined by International Union for Pure and Applied Chemistry (IUPAC) as roughly between about 1 nm to about 1 μm. As provided for herein, in the colloidal regime the self-assembly process is typically evaporation-driven rather than sedimentation-driven. The evaporation-driven assembly of colloidal particles into colloidal solids provides a longer window of time for particles to enter crystalline positions, which enables long range particle ordering to be achieved.

(2) Maintaining stable crystal growth. In previous techniques, the rate of liquid dispense and the vertical substrate motion had fixed set points. Because the rate of evaporation increases with time, there would be inevitable collapse of the liquid bridge, and therefore the height of the structure would be limited. Aspects of the present disclosure include implementation of real-time manipulation of the dispense rate to approximately match the rate of evaporation of the liquid, which enables continuous growth of the structure to an arbitrary height.

(3) Enhanced temperature control. In previous techniques, the rate of evaporation of the liquid was expedited via heating of the substrate. However, as the structure grew taller, the local temperature at the needle would decrease. The non-uniform temperature profile along the structure affects the rate of liquid evaporation, which results in unpredictable growth rates. Aspects of the present disclosure include improved temperature control via top heating plate(s) (around or near a dispensing component, e.g., a dispensing needle) and bottom heating plate(s) (at or near the substrate(s)). In some embodiments, top and bottom heating plates are set to the same temperature to maintain a uniform temperature to be throughout the solid structure during the growth process, which, a person skilled in the art, in view of the present disclosure, understands can be described by a scaling law.

(4) Assembly of crack-free structures. In the course of the current work it was observed that assembled structures having smaller colloidal particles (e.g., <about 100 nm) are more prone to cracking. Aspects of the present disclosure include techniques that enable deterministic control of cracking based on a geometric relationship between particle size and structure dimensions. This deterministic control enables the creation of colloidal solids that have a minimum number of cracks, and in at least some instances can be crack-free or devoid of cracks.

(5) Fabrication of freeform structures. In previous techniques, only conical and tower shaped structures were built. Aspects of the present disclosure provide for building freeform structures by coordinating additional degrees of motion. For example, coordinating vertical stage motion with rotation of the stage results in a helically shaped structure. The present disclosure provides for a stage having six degrees of freedom, although other numbers of degrees of freedom are possible.

In addition to the above improvements, the following variations of the technique enable controlling the microstructure and properties of the structures:

(1) Assembly of diverse particle types. Aspects of the present disclosure, including the direct-write assembly techniques, are generalizable to particles other than polystyrene. Aspects of the present disclosure include direct-write assembly of functional particles, such as dielectric silica microspheres, conductive gold nanoparticles, and semiconducting quantum dots.

(2) Post-processing of colloidal solids. Aspects of the present disclosure include fusing particles together, for example by post-process heating or by in situ laser heating, to increase mechanical strength. The solids can also be co-assembled with one or more other materials, for example a photopolymer, such as SU-8. The one or more other materials (e.g., photopolymer) can be crosslinked with a photoinitiator and/or UV light to enhance mechanical rigidity. Other post-processing is also possible and contemplated by the present disclosure.

(3) Aspects of the present disclosure include improving the mechanical properties of freestanding colloidal solids by methods such as sintering, in situ precipitation of a matrix between the particles, and assembling particles with functional moieties for inter-particle bonding.

(4) Aspects of the present disclosure can be straightforwardly applied to a plurality of different colloidal building blocks. For example, silica nanoparticles and gold nanocrystals, of approximately 40 nm and approximately 100 nm sizes, respectively. Aspects include tailoring the properties of macroscale colloidal materials via direct-write colloidal assembly, in combination with deliberate choice of particle size and composition. A person skilled in the art will appreciate other building blocks and sizes are possible without departing from the spirit of the present disclosure.

BRIEF DESCRIPTION OF DRAWINGS

This disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose.

Figure 1A:
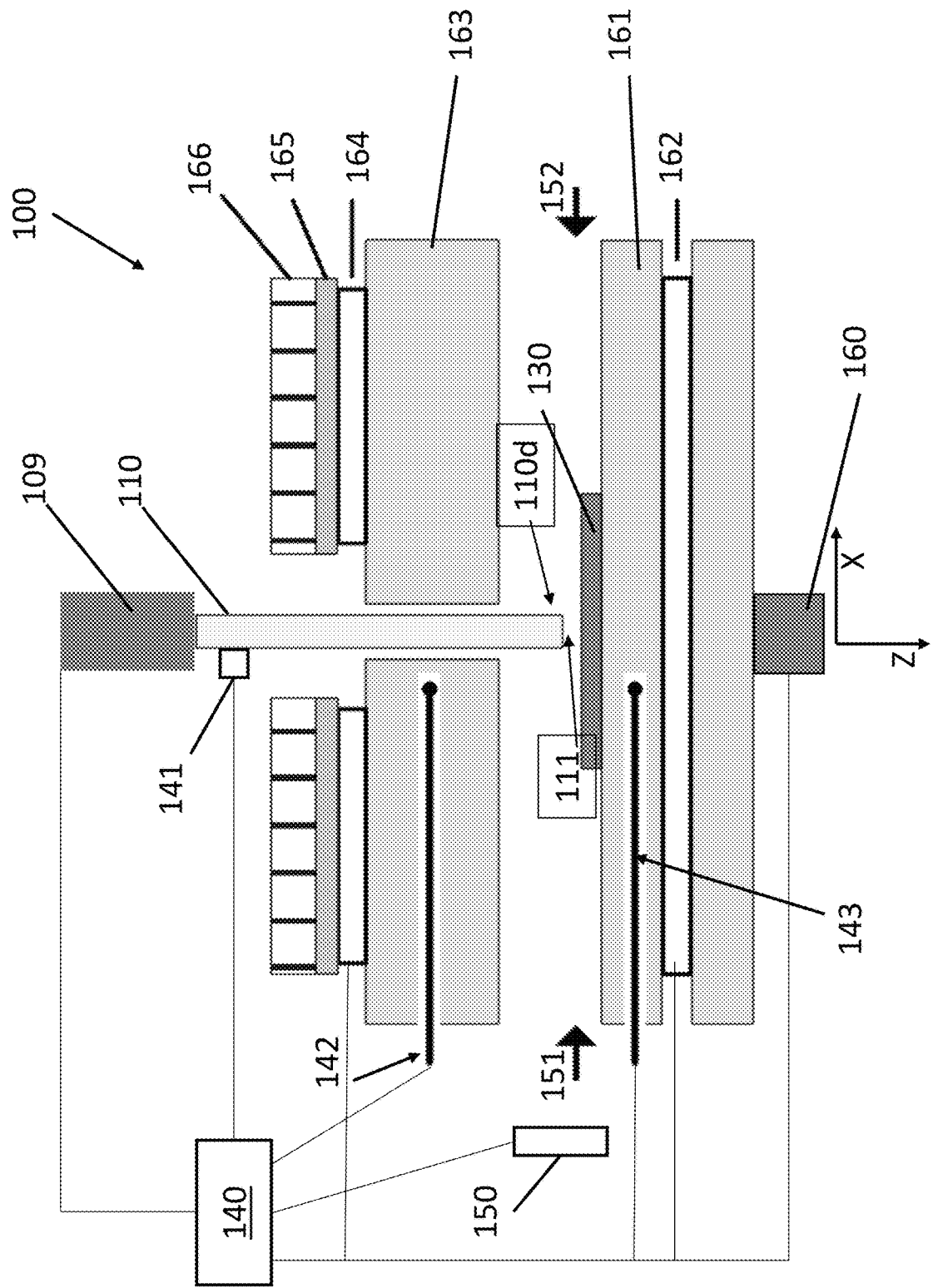
FIG. 1A is a schematic illustration of one exemplary embodiment of a system for fabricating a colloidal solid.

FIG. 1A is a schematic illustration of a system setup for construction of particle structures in a temperature controlled environment. FIG. 1A shows a system 100 including at least one fabrication surface, as shown a bottom plate 161 (also referred to as a stage) and top plate 163 positioned above the bottom plate 163. A top surface of the bottom plate 161 holds a substrate 130 below a dispensing component, as shown a dispensing needle 110, that passes through the top plate 163. In other instances, the dispensing component may be disposed adjacent to or be integrally formed with the top plate 163, or a top plate 163 may not be included. The bottom plate 161 can include a heating element 162 for heating the bottom plate 161 and a thermocouple 143 for monitoring the temperature of the bottom plate 161. The top plate 163 can likewise include a heating element 164 for heating the top plate 163, along with, in some instances, a copper block 165 and a heat sink 166 for removing heat from the top plate 163. The top plate can include a thermocouple 142 for monitoring the temperature of the top plate 163. A person skilled in the art will understand other components that can be used for purposes of sensing, heating, and dissipating heat in lieu of, or in addition to, the illustrated thermocouples 143, 142, heating elements 162, 164, copper block 165, and heat sink 166, among other components, without departing from the spirit of the present disclosure.

The system can include a controller 140 for controlling the heating element 162, 164 in response to the input from the thermocouples 143, 142. The system 100 includes a pump 109 that controls the delivery of a liquid flow (e.g., a colloidal particle suspension, as described in greater detail below) through the dispensing needle 110. The dispensing needle 110 has a distal end positioned near the substrate 130 for delivering the liquid to the substrate 130. In some instances, the system 100 includes a pressure sensor 141 for measuring the pressure of the liquid delivered through the dispensing needle 110. Alternatively, or additionally, the system 100 can include a sensor, such as an imaging device 150, configured to observe a distal tip 110d of the dispensing needle 110 to observe, as indicated by arrow 151, the character of a liquid bridge formed by the dispensing needle 110 (e.g., the size, shape, configuration, etc.), as explained in more detail below. In some instances, the system 100 includes a light source illuminating the distal tip 110d of the dispensing needle 110, as indicated by arrow 152. In other embodiments, the light source can be provided on the dispensing needle 100 and/or on the imaging device 150, among other possible locations. Although in the illustrated embodiment the dispensing component is illustrated as a dispensing needle, a person skilled in the art, in view of the present disclosures, will understand other dispensing components that can be used in lieu of, or in conjunction with, a dispensing needle, including but not limited to a nozzle, a valve, a pump, an extruder, and other devices or components capable of dispensing a liquid (e.g., a colloidal particle suspension).

In operation, colloidal solid structures can be constructed by first positioning an orifice 111 of the dispensing needle 110 near or proximate to the substrate 130 and dispensing a colloidal solution, which includes a liquid with suspended particles, from the orifice to establish a liquid bridge between the substrate 130 and the orifice 111 (i.e., between the substrate 130 and the dispensing needle 110, or more specifically the distal tip 110 of the dispensing needle 110). A colloidal solid forms on the substrate as the liquid from the colloidal solution is removed (e.g., by evaporation) and the particles are predicated together by a force from the removed (e.g., evaporated) liquid. The liquid bridge can be maintained by continuously dispensing the colloidal solution to balance the rate of liquid removal (e.g., evaporation). As particles accumulate into a colloidal crystal at the base of the liquid bridge, the substrate can be retracted at a rate that is approximately equal to a rate of growth of the colloidal crystal. This maintains the liquid bridge while precipitating a colloidal crystal structure from its bottom. A person skilled in the art will understand that to the extent the present disclosure discusses a liquid being evaporated, other techniques for removing or otherwise eliminating all, or a portion of, a liquid can be used to achieve similar results. Accordingly, descriptions using the word "evaporate," or derivations thereof, are by no means limiting, and instead are typically applicable to any techniques known to those skilled in the art for removing a liquid. The present disclosure contemplates both affirmative actions taken to remove (e.g., evaporate) a liquid from the dispensed colloidal solution, as well as passive actions that may occur to cause removal (e.g., evaporation that occurs by way of a natural environment). Alternative ways by which liquid can be removed include, but are not limited to, wicking at least a portion of the liquid from the dispensed colloidal particle suspension into the substrate 130 and/or diffusing at least a portion of the liquid from the dispensed colloidal particle suspension into an ambient medium, such as gas (e.g., air). As described herein, removing at least a portion of the liquid from the dispensed colloidal particle suspension can cause the colloidal solid to include a crystal structure.

In operation, a colloidal solution is dispensed through the distal orifice 111 of the dispensing needle 110. The pump 109 can precisely control the rate of colloidal solution dispensed from the dispensing needle 110. A combination of substrate 130 motion and dispensing of the colloidal solution can establish and subsequently maintain a liquid bridge of colloidal solution between the dispensing needle 110 (at the orifice 111) and the substrate 130. The liquid bridge initially bridges between the dispense orifice 111 and the substrate 130, and then between the dispensing orifice 111 and the precipitating colloidal solid. A flow of colloidal solution pumped through the liquid bridge serves to deliver particles towards and to the substrate 130, as well as compress the particles together at the base, or bottom, of the liquid bridge to form the precipitating colloidal solid, as shown in more detail in FIG. 1B.

In some instances, the colloidal solid forms a crystal structure, and an amount of compression vs. repulsion between the particles in the colloidal solution as the liquid of the solution is evaporated, and the amount of time to fully compress the particles into intimate contact once they are part of the colloidal solid, determines the crystallinity. The surface tension of the colloidal solution can determine a maximum compression pressure force that can be applied to the particles of the colloidal solution. In some instances, in order for the colloidal solution to flow through the liquid bridge, the colloidal solution must be continually removed from the precipitated colloidal solid, e.g., by evaporation or other means.

In some instances, a temperature controlled environment surrounding the precipitating colloidal solution can be maintained via temperature control of at least one of the dispensing needle 110, the substrate 130, and the surrounding environment. As a colloidal solid precipitates from the dispensing needle 110 and onto the substrate 130, the temperature of the dispensing needle 110 can be controlled by the top temperature-controlled plate 163, while the temperature of the substrate 130 can be controlled by the temperature-controlled stage or bottom plate 161 on which the substrate 130 sits. The temperature of the top plate 163 and the bottom plate 161 can be independently controlled, although in some instances they can be controlled together, for example, to produce a desired effect across the liquid bridge. For freeform fabrication of the colloidal crystal, the motion of the bottom plate 161 can be controlled to move in three orthogonal axes. In some instances, the bottom plate 161 can be controlled to rotate or tilt in one or more axes.

An example dispensing system 100 includes a glass syringe (not shown) and dispensing needle 110 mounted vertically above two parallel and opposed aluminum plates 161, 163 (FIG. 1A) that create a uniform temperature environment for the particle structures. The dispensing needle 110 passes through a hole in the top plate 163, and the substrate 130 rests on the bottom plate 161 as illustrated in FIG. 1A. The top and bottom plates 163, 161 can be uniformly heated by heating elements 162, 164 (e.g., thermoelectric chips), and the plate temperature(s) can be measured by embedded thermocouples 143, 142, which can feed to a controller 140. The thickness of the top plate 163 can be chosen so that a particle suspension dispensed through the needle 110 heats to the temperature of the top plate 163 while transiting its thickness for the dispense rates used in experiments. A person skilled in the art, in view of the present disclosures, will understand how to choose such a thickness. Motion of the pump 109 (e.g., a syringe plunger) and/or the bottom plate 161 (FIG. 1A) can be motorized. For example, as shown in FIG. 1A, one or more motors 160 can provide a step size of approximately 0.078 µm. Depending on the volume capacity of particle suspension required and/or desired to build the structures, syringes with piston diameters (e.g., approximately 2.30 mm, approximately 3.26 mm) that respectively correspond to dispensing precisions (e.g., approximately 0.3 nl, approximately 0.7 nl, respectively) can be used. In some embodiments, the dispensing needles can be made of glass for smaller sizes (e.g., inner diameter/outer diameter approximately=50 µm/80 µm, 82 µm/120 µm, 200 µm/250 µm, 400 µm/500 µm, 600 µm/700 µm), and of stainless steel for larger sizes (e.g., inner diameter/outer diameter approximately=0.84 mm/0.127 mm). The diameter of the colloidal solids can be approximately equal to the inside diameter of the needle. A person skilled in the art will recognize other sizes and materials can be used without departing from the spirit of the present disclosure.

Figures 1B, 1C:
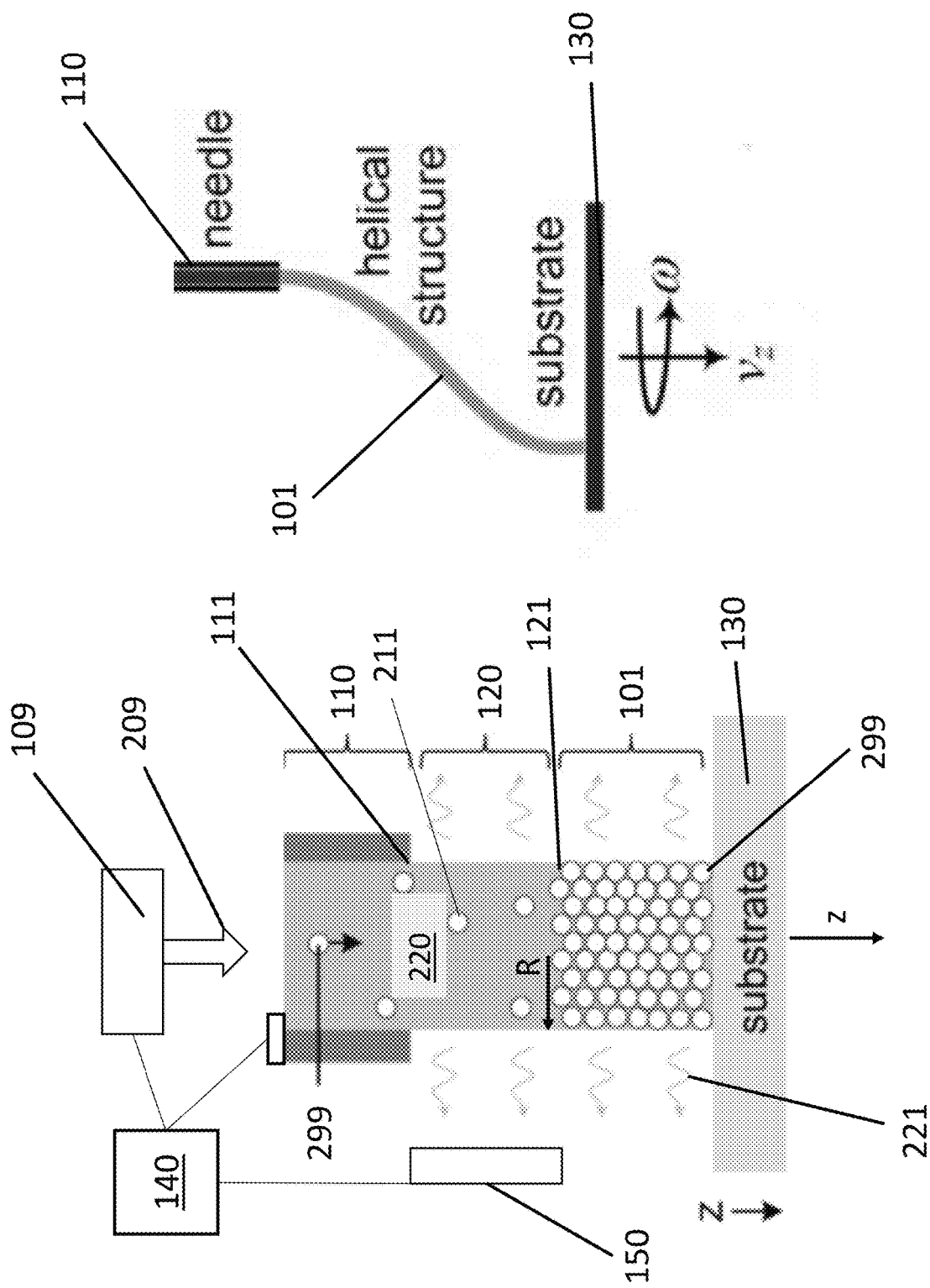
FIG. 1B is a schematic illustration of portions of the system for fabricating a colloidal solid illustrated in FIG. 1A, the components including a liquid dispensing component (e.g., a dispensing needle), at least one fabrication surface (e.g., a substrate), a controller, a pump, and an imaging device, which produces a colloidal solid and a liquid bridge.
FIG. 1C is a schematic illustration of the liquid dispensing component and at least one fabrication source of FIG. 1B being operated to produce a helical colloidal solid.

FIG. 1B is a schematic illustration of the dispensing needle 110 while fabricating a colloidal solid 101 on the substrate 130. In operation, direct-writing of the colloidal solid 101 is performed using the system 100 wherein a colloidal solution (e.g., a colloidal particle suspension) 209 is dispensed through the orifice 111 of the dispensing component, as shown the dispensing needle 110. Fine position control relative to the substrate 130 and/or a temperature-controlled environment can also be provided to enhance the fabrication processes and systems.

The colloidal solution 209 includes particles 211 in suspension with a liquid 220. The formation of the colloidal solid 101 can be initiated by dispensing a small amount of suspension 209 to form a liquid bridge 120 between the substrate 130 and the needle 110, as shown, at the orifice 111. This liquid bridge 120 provides confinement for the assembling particles 299 that accumulate at the base of the liquid bridge. The particles from the suspension accumulate into a solid layer at the base, or bottom, 121 of the liquid bridge 120 as the liquid 220 of the colloidal solution evaporates into the temperature-controlled environment, which is indicated by flow lines 221. As provided for herein, other methods for causing the liquid 220 to be removed can be used besides evaporation. Additionally, the substrate 130 can be retracted downward (in the z direction, as shown) as the particles 299 accumulate. In order to form a high aspect ratio vertical structure, for example, the substrate 130 can moved downward at a rate approximately matched to the vertical growth rate of the particle structure 101.

The colloidal solution 209 can include two or more liquids. In some instances, the removal rate of a second liquid can be zero, and is thereby left behind in the colloidal solid. In other instances, the rate of removal of a second liquid can be non-zero, and can fully evaporate but leave a residue or coating on the solid colloid particles. A person skilled in the art, in view of the present disclosures, will understand other configurations of a colloidal solution that can be used, including designs that specifically allow one liquid to be removed faster or slower than the other.

The colloidal solid formation process can be terminated at any point by halting the flow from the dispensing needle 110, after which evaporation, or other techniques that remove liquid from the dispensed colloidal solution, can cause the liquid bridge 120 to collapse. The dispense rate from the pump 109 and translational motions of the substrate 130 relative to the dispensing needle 110 can be controlled by one or more motors 160, and the dispensing needle 110, tower of colloidal solid 101, and the substrate 130 can viewed in situ with an imaging device 150, such as one or more video microscope cameras. Other techniques and components for monitoring the formation of the colloidal solid 101 and/or the bridge 120 are provided for herein or otherwise known to those skilled in the art in view of the present disclosure, including but not limited to various types of sensors to monitor relevant parameters of one or more of the colloidal solution the colloidal solid 101, the bridge 120, and the components of the system 100 that assist in producing the same. In a non-limiting representative example, the dispense rate is approximately $10^{-2}$ µl/s, and the translational motions of the substrate relative to the needle is approximately 1 µm/s.

The temperature controlled top and bottom plates 163, 161 can be used to spatially control a temperature of the environment of the colloidal solid 101, such that a configuration of heated surfaces determines the spatial temperature profile of the surrounding environment. In some instances, heated top and bottom plates 163, 161 provide a uniform spatial temperature for the environment surrounding the colloidal solid 101. The heating can be of an ambient medium around the colloidal solid 101, such as gas (e.g., air).

The radius R of the assembled colloidal solid structures (also referred to herein as colloidal solids or colloidal towers) can be set by a radius of the inner diameter of the dispensing needle 110 that forms the orifice 111 at the distal tip 110d and the resulting width of the liquid bridge 120 between the orifice 111 and the substrate 130 or the existing colloidal solid 101. The local width and curvature of the colloidal solid 101 can be modulated by changing the dispense rate of the colloidal solution 209 relative to the vertical rate of motion between the dispensing needle 110 and the substrate 130. When the dispense rate of the colloidal solution 209 is less than the rate of removal (e.g., evaporation), the liquid bridge 120 can neck, or narrow, in diameter, and when the dispense rate of the colloidal solution 209 is greater than the rate of removal (e.g., evaporation), the liquid bridge can bulge, or grow, in diameter. Accordingly, a colloidal solid 101 of varying cross section radius R can be made by modulating the character of the liquid bridge 110 (e.g., the size, shape, configuration, etc.). Construction of the colloidal solid 101 can be terminated by halting the dispensing of the colloidal solution 209, which can cause the liquid bridge 120 to collapse due to evaporation, which is indicated by flow lines 221.

The base of the liquid bridge 120 can stays in contact with the substrate 130 and be moved around in-plane to deposit a 2D colloidal assembly onto the substrate 130 such that movement of the substrate 130 and/or the pumping speeds can determine a thickness of the deposited layer of the colloidal solid. In some instances, the liquid bridge 120 can be controllably moved away from the substrate 130 to precipitate a 3D structure such that the base of the liquid bridge 120 is only in contact with the precipitating part of the colloidal solid 101. In some instances, a 3D colloidal structure can be built layer-by-layer by a plurality of 2D layers. As provided for herein, a 2D colloidal layer or structure can be a solid having an aspect ratio (i.e., height/width) of less than about one (1), often much less than one (1), and a 3D colloidal structure of assembly can be a solid having an aspect ratio (i.e., height/width) greater than one (1), often much greater than one (1), such as ten (10).

In some instances, the liquid bridge remains approximately the same size, and the orifice 111 of the dispensing needle 110 therefore remains approximately the same distance from the precipitation colloidal solid 101. In some instances, it is the relative distance and orientation of the dispensing orifice 111 with respect to the substrate 130 that controllably changes over the course of construction to produce a desired shape of a colloidal solid.

The system 100 can include a feedback control system for maintaining a desired quality of the liquid bridge 120. For example, the imaging device 150 can be used by the controller 140 to quantify the shape or character of the liquid bridge 120, and then, in response, adjust one or more of the delivery rate of the colloidal solution, the temperatures of the top and/or bottom plates 161, 163, the temperature of the surrounding environment, and the distance between the orifice 111 and the substrate 130 and/or the colloidal solid 101, the distance being adjustable across a number of degrees of freedom (e.g., up to six). Additionally, the pressure sensor 141 (FIG. 1A) can be used to monitor the character (e.g., the size, shape, configuration, etc.) of the liquid bridge 120 and one or more of the delivery rate of the colloidal solution, the temperatures of the top and/or bottom plates 161, 163, the temperature of the surrounding environment, and the distance between the orifice 111 and the substrate 130 and/or the colloidal solid 101, the distance being adjustable across a number of degrees of freedom (e.g., up to six) can be adjusted. In some instances, the controller 140 can perform, or at least initiate the performance of, the action(s) to adjust the character of the liquid bridge 120. Further, in some instances, the properties of the colloidal solution 209 itself can be altered, in a manner similar to the way adjustments of other properties are provided for herein.

Freeform shapes of colloidal solids 101 can be built by coordinating additional degrees of freedom in the motion of the substrate 130 or the motion of the dispensing needle 110, such as a helical structure as shown in FIG. 1C. FIG. 1C shows the dispensing needle 110 creating a freestanding helical shaped solid, built by simultaneously rotating ($\omega$) and lowering ($v_z$) the substrate 130.

Figure 2A:
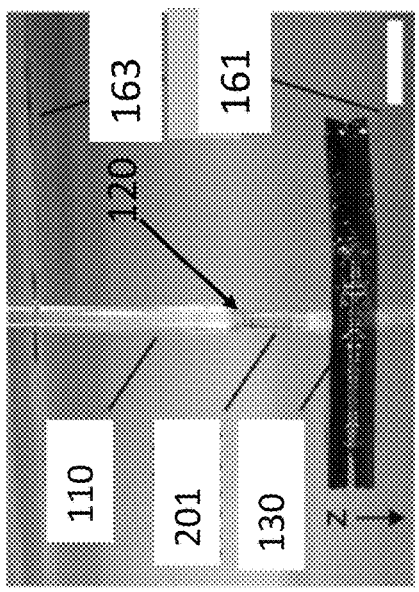
FIGS. 2A-2C are photographs of different stages of a direct-write fabrication process being performed to produce a macroscale freestanding colloidal solid, the process being formed using the system for fabricating a colloidal solid of FIG. 1A.
Figure 2B:
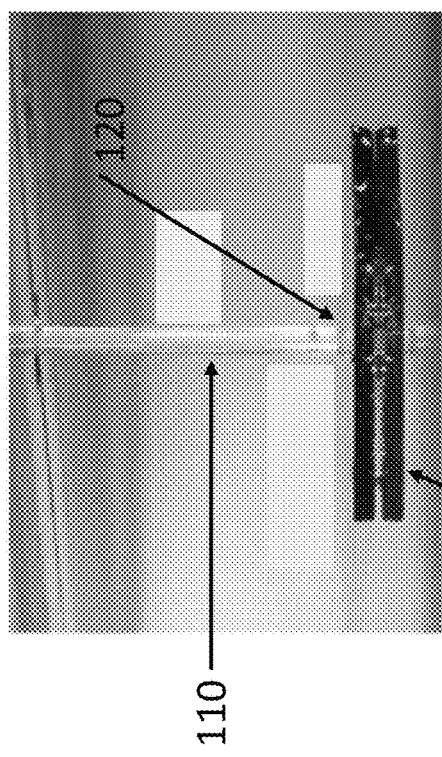
Figure 2C:
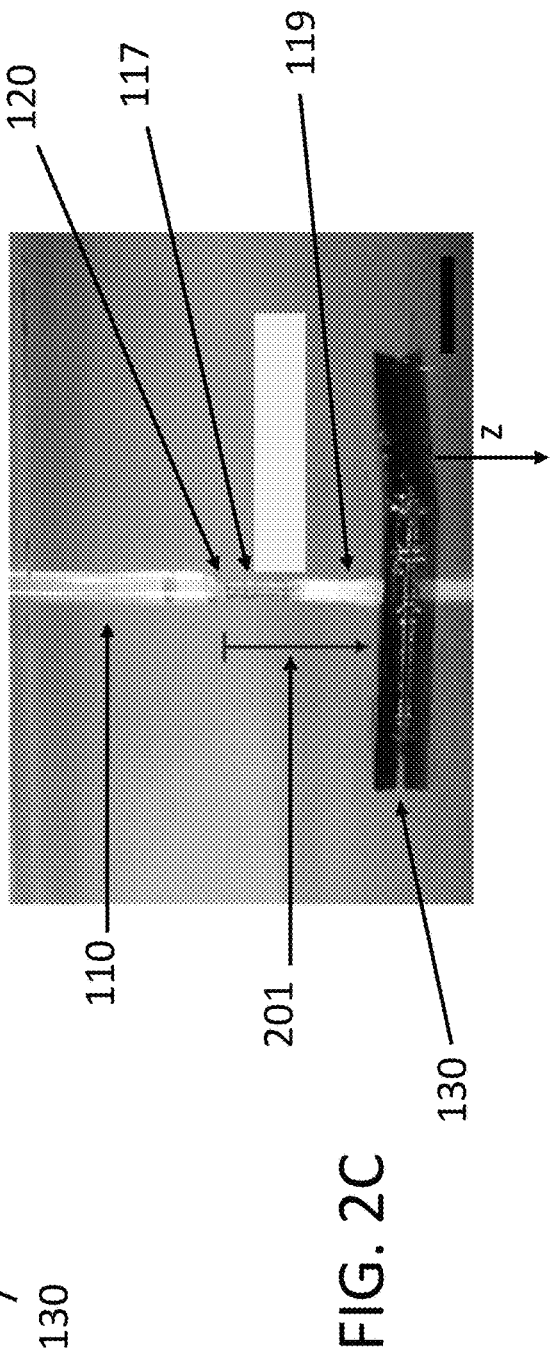

FIGS. 2A-C are photographs of different stages of a direct-write fabrication process being performed to produce a macroscale freestanding colloidal solid 201 according to embodiments of the present disclosure. The scale bars in FIGS. 2B and 2C are 2 mm. FIG. 2A shows the direct-write colloidal assembly is fabricated by precision dispensing of the colloidal solution 209 from the dispensing needle 110, followed by controlled downward or multi-axis substrate motion of the substrate 130 with respect to the dispensing needle 110 to build the colloidal crystal solid 201, as shown in FIGS. 2B and 2C. In the representative example of FIGS. 2A-2C, colloidal solids were constructed using aqueous solutions of spherical polystyrene particles, although other materials are possible, including but not limited to other materials provided for herein.

FIG. 2A shows the initiation of the particle solid being precipitated from an aqueous suspension at the base of the liquid bridge 120 maintained at the orifice 111 of the dispensing needle 110. The liquid bridge is first established with the substrate 130, and then, as shown in FIG. 2B, the substrate 130 is withdrawn at a steady rate in the Z direction that approximately matches the rate of particle accumulation, while the dispensing rate of the aqueous suspension 209 from the orifice 111 of the dispensing needle 110 approximately matches the rate of liquid evaporation (or other liquid removal technique relied upon by the system). As shown, the dispensed solution 209 forms a wet section 117 and a dry section 119 of the bridge 120 extending between the dispensing needle 110 and the substrate 130.

Figure 3:
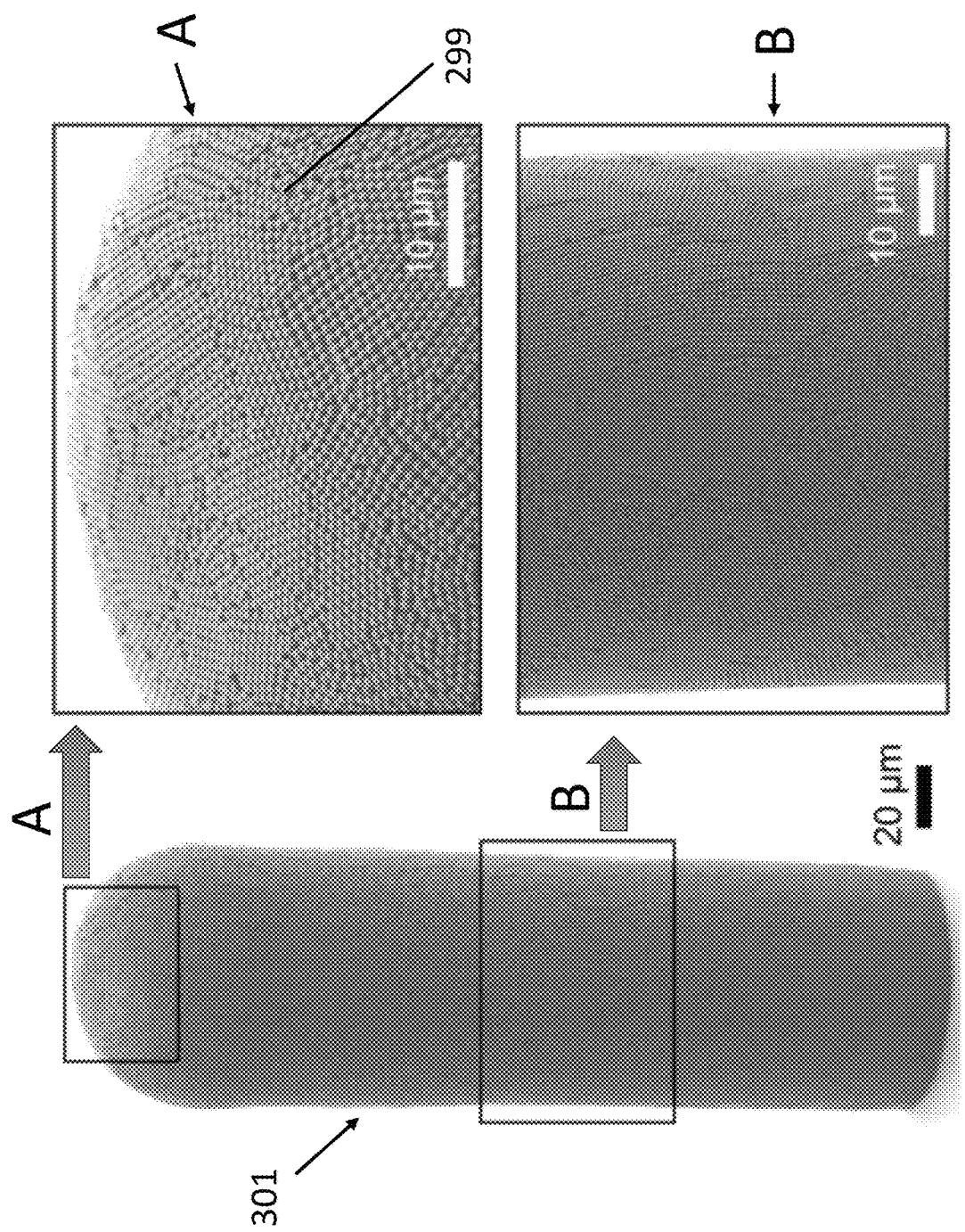
FIG. 3 is scanning electron microscopy (SEM) image of a freestanding colloidal solid that can be produced using fabrication systems like that of FIG. 1A.

FIG. 3 is scanning electron microscopy (SEM) image of a freestanding colloidal solid 301 assembled using the system 100 provided for and described herein. The colloidal solid 301 is assembled of spherical polystyrene particles with a radius, a, of approximately 500 nm, at volume fraction $\phi_1 \approx 0.025$. Views A and B are close up views of top and middle sections of the colloidal solid 301, showing the structure of the individual particles.

The size of the particles in the colloidal solid structure 301 of FIG. 3 was chosen such that the dispensing and evaporation processes do not result in appreciable sedimentation of the particles during the timescale of the experiment, for example, approximately one hour to approximately two hours. In prior studies, precise dispensing of approximately 10 μm microparticles from a dispensing component can result in tower structures. However, the dominance of sedimentation at that larger particle size prevented long-range ordering, such as the ordering visible in views A and B in FIG. 3.

The particle size can be chosen such that the sedimentary forces felt by the dispensed particles is less than the repulsions between the particles due to their electric charge. This relationship between forces enables the evaporation of the liquid to create the pressure necessary to move the particles together to form the solid. This permits the evaporative process to overcome the electric repulsion to drive a long range ordering of the particles, instead of the sedimentary forces. This balance can determine an upper limit on the size of the particles. Calculations suggest this upper threshold particle radius is less than about 1 µm for polystyrene, less than about 400 nm for silica, and less than about 100 nm for gold. A lower limit can be determined by the Brownian motion of the particles because these forces grow as the particle size shrinks, and eventually the evaporative forces are not sufficient to overcome them.

Figures 4A, 4B:
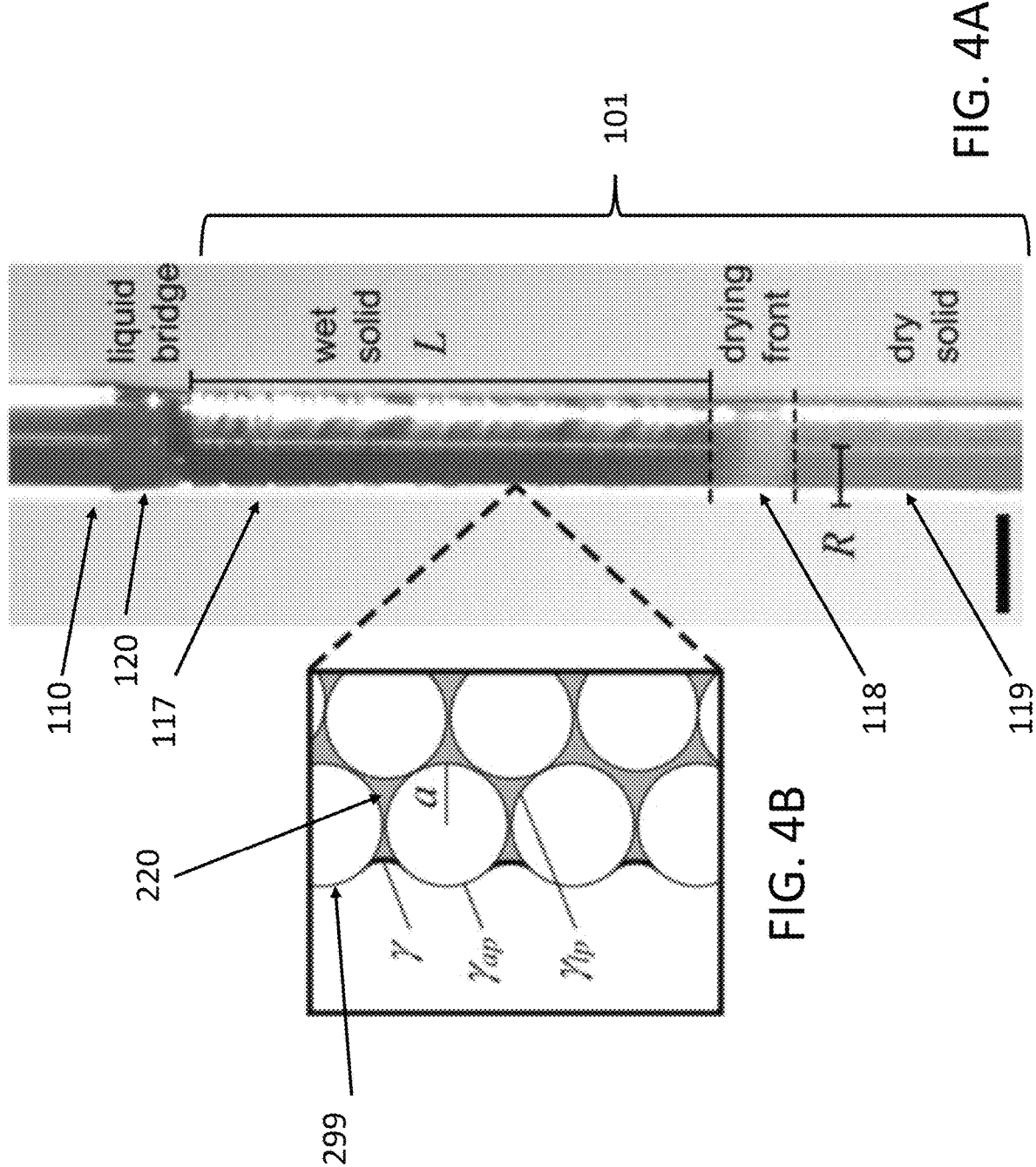
FIG. 4A is a photograph of a colloidal solid during fabrication using the fabrication system of FIG. 1A.
FIG. 4B is a schematic of a wet section of the colloidal solid of FIG. 4A.

FIG. 4A is a photograph of the assembly of a colloidal solid according to aspects of the present disclosure. FIG. 4A shows an in situ video microscopy image showing an assembly operation of the colloidal solid 101, with a 200 µm scale bar. The colloidal solid 101 of radius R precipitates wet (i.e., saturated with water between the particles, as shown in more detail in FIG. 4B), from the dispensing needle 110. A wet section 117 and a dry section 119, as well as a drying front 118 in between, are easily distinguishable based on optical appearance-the wet section 117 is darker than the dry section 119, and the drying front 118 is opaque white. The evaporation from the surface of the wet section 117 of length L of the colloidal solid 101 can then dry at a distance L below the bottom of the liquid bridge 120. The precipitation of the colloidal solid 101 can occur by an influx of liquid 220 (e.g., water or other volatile liquid) and particles 299 through the bottom of the liquid bridge 120. The volatile liquid can be an organic solvent such as toluene, chloroform, hexane, and ethanol, among other volatile liquids known to those skilled in the art.

FIG. 4B illustrates particles 299 of radius a near the surface of the wet region 117 of the colloidal solid 101, and the surface tension quantities on the air-liquid ($\gamma$), air-particle ($\gamma_{ap}$), and liquid-particle ($\gamma_{lp}$) interfaces. In FIG. 4B the liquid 220 flowing into the wet section 117 compresses the particles 299 downward while the capillary pressure at the our surface of the section, due to the surface tension $\gamma$ of the liquid, provides lateral constraint. This capillary pressure drives water through the wet section to its outer surface, where the water evaporates or is otherwise removed. The water experiences a resistance to flow due to its viscosity $\mu$ as it travels in the interstitial spaces between the particles packed at volume fraction $\phi_2$, driven locally by the pressure gradient $\nabla P$. In some instances, the Reynolds number is Re≤$10^{-3}$, based on the dispense rates and particle sizes.

In some configuration, the compressive force provided by the flow of liquid 220 and the surface tension that precipitates the colloidal solid 101 may initially be too weak to bring the particles 299 into direct contact (i.e., at the base of the liquid bridge 120), however the compressive forces becomes sufficiently strong to bring the particles into direct contact sometime after. For example, as evaporation rates increase, or as the amount of liquid 220 remaining in the wet section 117 decreases.

A freshly precipitated section of the colloidal solid, e.g., the wet section 117, can have some space between the particles 299, but as that section 177 approaches the transition through a drying front 118, the pressure from the evaporating liquid 220 can be sufficient to force the particles into intimate contact. In some instances, because there can be some initial space between the non-contacting particles 299, the particles 299 can settle into a crystal arrangement in the colloidal solid 101. In some instances, the type of crystallinity in the crystal arrangement can depend on the relative magnitude of electrical repulsion and compression by the flow. The crystallinity can also depend on the dimensions of the colloidal solid 101. For example, a small diameter structure can form a single crystal, but a larger diameter structure can be polycrystalline. The combination of particle size, liquid properties, flow rates, and structure dimensions can help determine the resulting crystallinity. In some instances, the crystallinity is controlled in real-time during dispensing based on at least one of the particle size, liquid properties, and flow rates. In some instances, the diameters of the resulting colloidal solids 101 can range from approximately 50 µm to approximately 1 mm. Through this range of dimensions, colloidal solids built by direct-write colloidal assembly can be polycrystalline, though the packing of the smaller particles (e.g., 44 nm) can be less ordered due to broad size dispersity (e.g., CV=11%).

Scaling of Build Rate in an Example Direct-Write Colloidal Assembly Process

Figure 5:
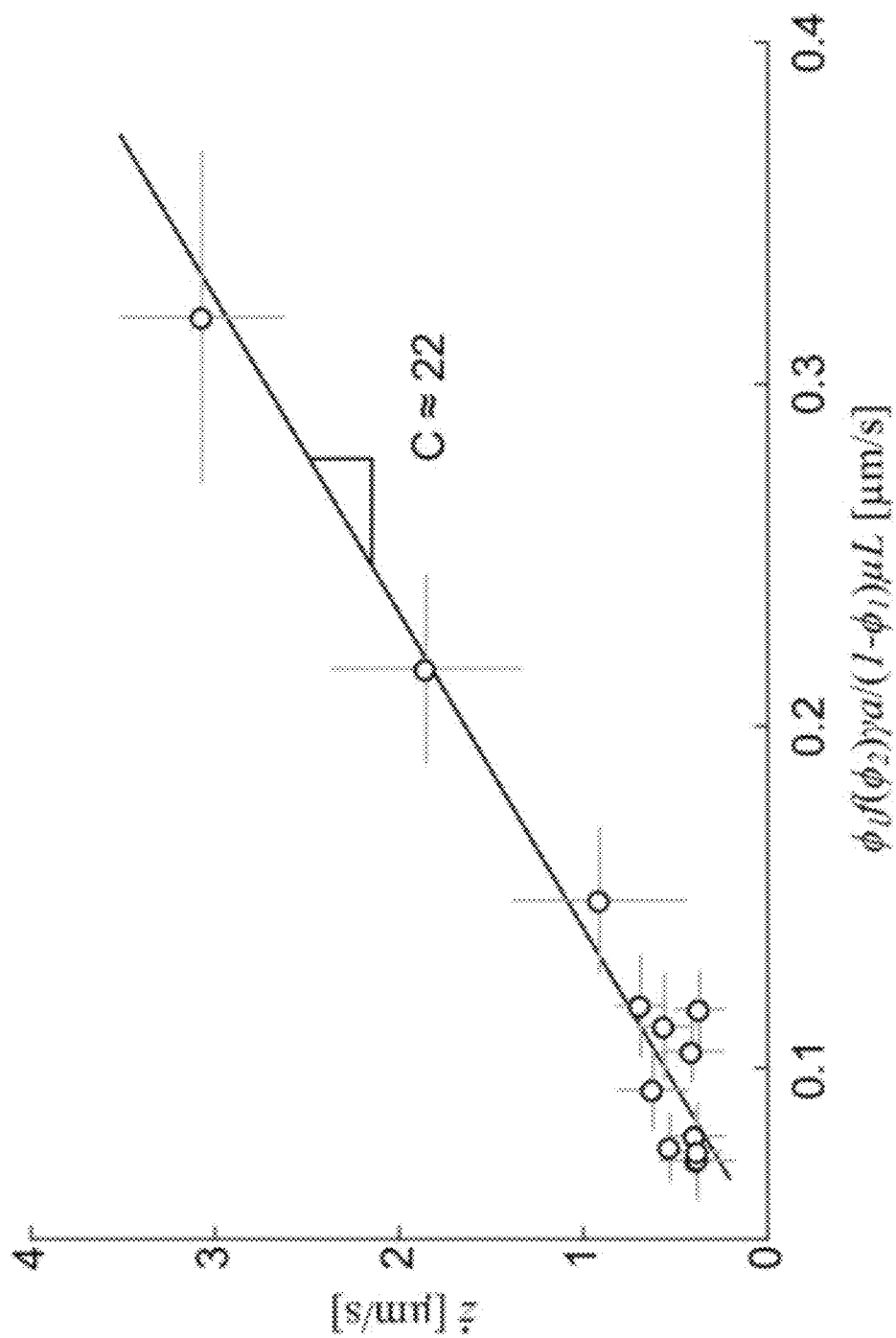
FIG. 5 is a graph illustrating a steady state build rate of a plurality of different colloidal suspensions that were fabricated using a fabrication system like that of FIG. 1A.

FIG. 5 is a graph illustrating a steady state build rate of a plurality of different colloidal suspensions that were fabricated using a fabrication system like the system 100. A quantitative understanding of the factors governing the build rate in direct-write colloidal assembly was obtained by performing a series of experiments where vertical structures of constant radius R were built with various particle radii a. Experiments were performed with polystyrene spheres suspended in water, where the polystyrene particles occupy volume fraction $\phi_1 \approx 0.025$. For steady build of a vertical structure with uniform radius R, the wet length L can be constant and the speed at which the substrate is withdrawn from the needle to build the structure $\dot{z}$ can relate to the above-mentioned quantities as follows.

The energy change dewetting a particle 299 of surface area $A_p$ is $u=(\gamma_{ap}-\gamma_{lp})A_p=\gamma \cos\theta\, A_p$ as its surface energy changes from liquid-particle $\gamma_{lp}$ to air-particle $\gamma_{ap}$. Young's law $\gamma_{ap}-\gamma_{lp}=\gamma \cos\theta$ defines the contact angle $\theta$. The free energy change associated with dewetting a differential layer dz of the structure is therefore $dF=(u\phi_2/V_p)\pi R^2 dz$, where $V_p$ is the volume of a particle and $\phi_2$ is the volume fraction of particles in the wet solid 117. The pressure difference $P_F$ of the liquid relative to atmosphere at the drying front is the negative change in free energy per cross section area $P_F=-(dF/dz)/\pi R^2 \sim -\phi_2 \gamma \cos\theta/a$.

It was assumed that the average flux of water q through the liquid bridge 120 into the solid 101 is governed by Darcy's law $q=(-k/\mu)\nabla P$, where the permeability of the structure k must, on dimensional grounds, be of the form $k=f(\phi_2)\, a^2$ and using the Kozeny-Carman equation it is approximated that $f(\phi_2) \approx (1-\phi_2)^3/45\phi_2^2$. The pressure at the top of the solid 101 is set by the capillary pressure of the liquid bridge 120 $P_B \sim \gamma/R$, so $$\nabla P \sim \frac{P_F - P_B}{L} \sim -\phi_2 \cos\theta \frac{\gamma}{La} \text{ by } \frac{P_F}{P_B} \sim \frac{R}{a} \gg 1,$$

and the build rate of the colloidal solid 101 is therefore:

$$\dot{z} \approx C \frac{\phi_1 f(\phi_2) \gamma a}{(1-\phi_1)\mu L} \quad \text{(Equation 1)}$$

Mass balance results is $q=\dot{z}\phi_2(1-\phi_1)\phi_1$, $\phi_2 \approx 0.73$ based on X-ray microscopy measurements, and the proportional factor C includes $\theta$. Experimentally, C≈22 for all colloidal solids 101 built to heights greater than or equal to L, the length of the wet section 117. Equation 1 fits the data well, for a plurality of colloidal solids 101 with particle sizes, a, ranging approximately from about 44 nm to about 110 nm, resulting in a growth rate of approximately 0.5 µm/s to approximately 3 μm/s. The build rate ż can be inversely proportional to L because a shorter L means a greater pressure gradient and therefore greater flow by Darcy's law. Accordingly, in some instances, the intuition that a longer wet section 117 implies a faster build rate—that is, more surface area implies greater total evaporation and greater flow rate through the dispensing needle 110—is true only for colloidal solids 101 built to heights shorter than L.

Accordingly, the steady state build rate 2 can follow a simple scaling relationship with γ, a, L, the volume fraction of particles in the suspension $\phi_1$, volume fraction of particles in the solid $\phi_2$, and viscosity of water μ.

Example Fabrication of Crack-Free Colloidal Solid Macrostructures

The functional properties of a colloidal solid can depend on its macroscale shape as well as the composition and arrangement of its microscale constituent particles. Colloidal solids and crystals may exhibit unique optical, chemical, and mechanical properties, and methods to engineer the production and assembly of colloid particles enable the design of materials for diverse applications, including optical coatings, biological and chemical sensors, and battery electrodes. Defects in the microscale structure of colloidal crystals, however, are typically detrimental to material performance and therefore are often worth managing. In particular, the presence of cracks often diminishes the optical responses of photonic colloidal crystals, the mechanical and chemical loading capability of colloidal batteries, as well as the protective and aesthetic qualities of paints, inks and coatings, among other resulting materials, objects, etc.

A subset of colloidal solids produced with the present direct-write technique can exhibit cracking during drying and a method is disclosed herein for preventing crack formation. For a dry elastic material, the propagation of a crack is energetically favorable when the strain energy released exceeds the corresponding increase of surface energy. This is the basis of elastic fracture mechanics used to predict material failure in innumerable scenarios. Crack propagation in a homogenous elastic material subject to isotropic compression is never energetically favorable because the introduction of a crack creates surface energy without relieving any bulk stress. The slow drying of a liquid-saturated colloidal solid with an unconstrained boundary can be considered an example of such a case, where a capillary pressure at the outer surface of the network of colloidal particles causes isotropic compression and volumetric shrinkage. Indeed, the established approach is to treat the network of particles as a porous elastic continuum material that shrinks volumetrically during drying in a manner analogous to thermal contraction. In drying colloidal films, a fixed constraint with the underlying substrate is said to be responsible for generating tensile stress in the film, causing cracks.

Freestanding colloid solids were observed to develop cracks during drying either throughout their height or only at the free end, i.e., far from the substrate, where the network of particles is unconstrained in contracting its volume as it bears compression by a uniform capillary pressure acting at its outer surface. The presence and types of cracks is detailed herein, along with the development of a criterion for predicting crack initiation that relates the structure's geometry and particle size. The criterion is based on a scaling approximation of the dominant free energy terms, and suggests that Van der Waals attraction is responsible for initiation of the cracks. The developed criterion favorably matches experimental results and provides a guideline for constructing 3D colloidal solids with the embodiment disclosed herein that have a minimum number of cracks, and, in at least some instances, are crack-free or devoid of cracks.

Figure 6:
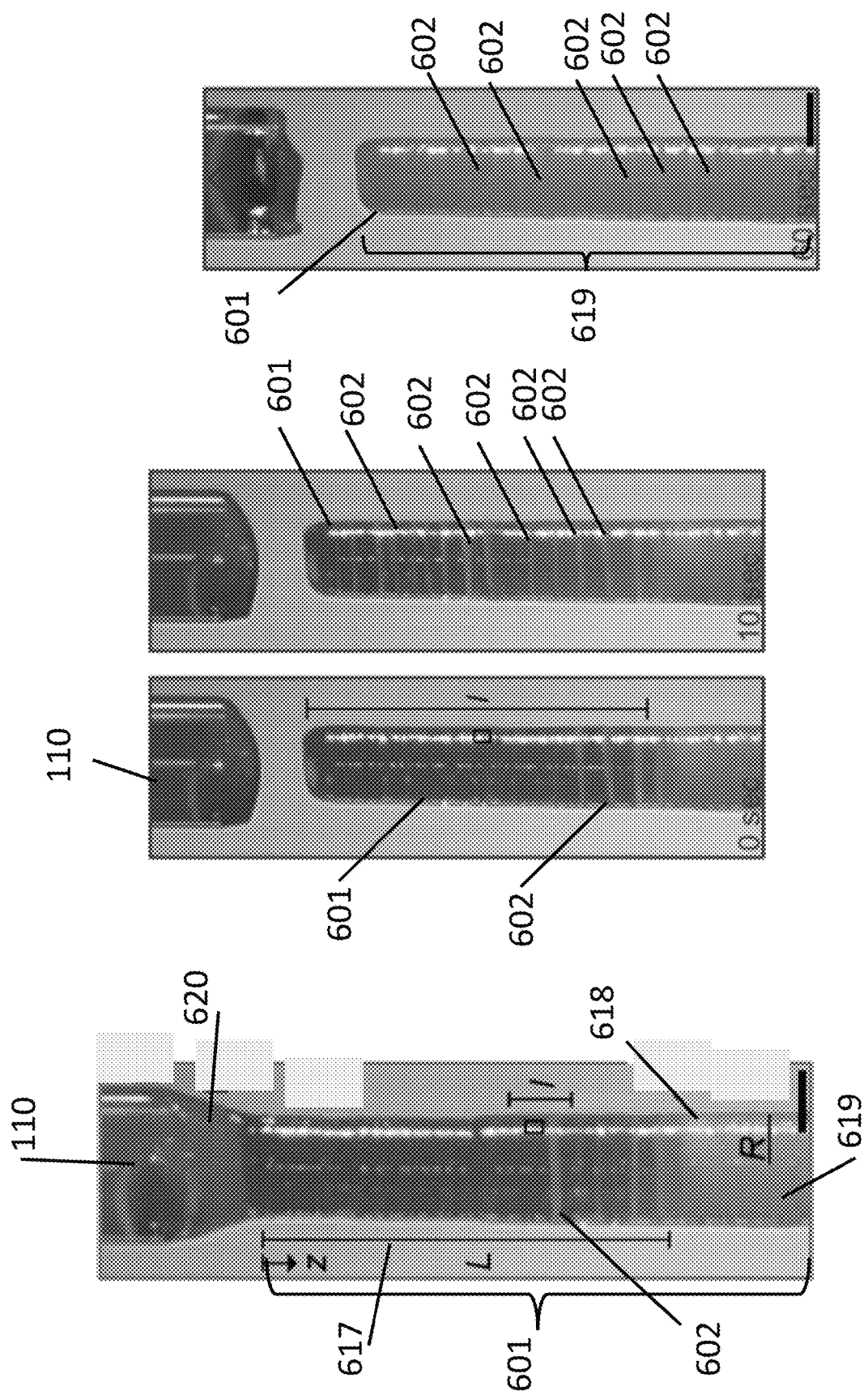
FIGS. 6A-6D are photographs of the construction and termination of an exemplary colloidal solid with visible radial cracking produced using the fabrication system of FIG. 1A.

FIG. 6A-6D are photographs of the construction and termination of an exemplary colloidal solid 601 having a particle size of approximately 44 nm and produced using the fabrication system 100. As detailed herein, during construction, the colloidal solid 601 precipitates wet from a liquid bridge 620 formed below dispensing needle 110 and evaporation occurs from the surface of a wet section 617, which drives an influx of liquid and particles through the liquid bridge 120. The colloidal solid 110 transitions through a drying front 618 (opaque white) to become completely dry at a distance L below the liquid bridge 120. Cracks 602 appear within the section 1 during construction, and the schematic of FIG. 4B shows the microscopic picture of the particles at the outer surface of the colloidal solid 601 in this section. FIGS. 6B-6D illustrate that after termination of the liquid bridge 620, the remaining wet section l approximately uniformly develops cracks 602 and then transitions through the drying front 618 to become completely dry. FIG. 6B shows the colloidal solid 601 at the moment of termination of the liquid bridge 620. FIG. 6C shows the colloidal solid 601 approximately 10 seconds after termination, where a plurality of cracks 602 in the wet section 617 are visible. FIG. 6D shows the colloidal solid 601 one minute after termination, where the drying front 618 has extended across the entire colloidal solid 601, leaving a dry section 619 with visible cracks 602.

FIGS. 6A-6D were obtained with aspects of the present direct-write process, whereby a set of vertical freestanding colloidal solids was constructed with uniform radius in a uniformly heated environment (approximately 70° C.), and formation of cracks was observed during drying in a subset of them. For the experiments of FIGS. 6A-6D and FIG. 7, the colloid suspension is monodisperse polystyrene spheres in deionized water, with radii a ∈ ⌊44,5000⌋ nm at volume fraction=0.025. The colloidal solids 601 precipitated wet, i.e., saturated with water between the particles, and dry at a distance L from the bottom of the liquid bridge, as shown in FIG. 6A. The wet sections 617 and dry sections 619, as well as the drying front 618 in between, are distinguishable based on optical appearance. Solids that developed cracks can be categorized as one of two types: those with shallow cracks in arbitrary orientations (not shown), and those with wide and circumferential cracks 602, as shown in FIG. 6C. The wide circumferential cracks 602 are typically visible in situ with video microscope cameras or another imaging device(s). The structures were imaged ex situ with a scanning electron microscope to confirm the presence and types of cracks.

Figure 7:
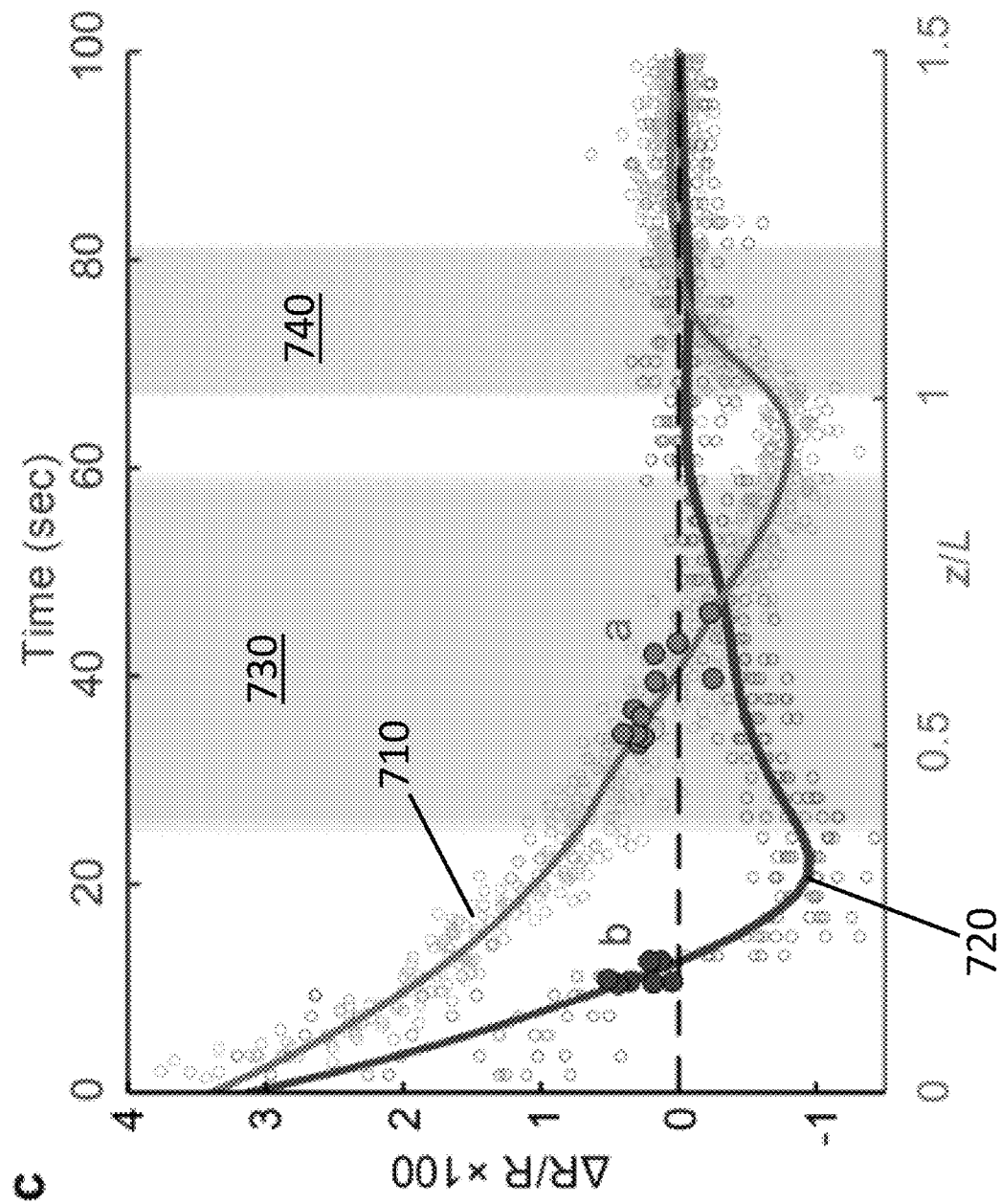
FIG. 7 is a graph illustrating radial change of a thin cross-sectional layer of a colloidal solid, relative to a final radius of the colloidal solid when dry.

The radial change of thin cross-sections of the colloidal solids 601 was measured over the course of drying, which showed that the capillary pressure causes radial constriction and then expansion to a final radius R upon passage through the drying front 617, as shown in FIG. 7. FIG. 7 is a graph of the radial change of a thin cross-section layer of a colloidal solid ΔR, relative to its final radius R when dry. In FIG. 7, the change over distance 710 was during construction as a function of the layer's distance below the bottom of the liquid bridge Δz, normalized by the structures wet length L, and the change over time 720 relative to the time of termination. The shaded time region 730 and the shaded distance region 740 correspond to the passage through the drying front 618, which relieves the capillary pressure constricting the colloidal solid 601.

In FIG. 7, the radial change of each thin cross section is represented as the difference ΔR relative to its final radius R when dry. In the experiments plotted in FIG. 7, the circumferential cracks 602 consistently appear in the wet section 617 of the colloidal solid 601 with its radius constricted to approximately R, i.e., ΔR=0, and this was observed in two instances: (1) in the portion of wet section 617 just above the drying front 618 during construction, as shown in FIG. 6A, and (2) throughout the entire wet section 617 at the top of the colloidal solid 601 during evaporation of the remaining liquid after construction terminates, as shown in FIGS. 6B-6D. For the latter, (2), the radial change and transition through the drying front 618 are approximately uniform across the wet section 617 at the top, and in some structures the cracks only appear here. This indicates that the mechanism for crack formation is independent of the fixed constraint at the substrate, in contrast to crack formation in drying colloidal films.

FIG. 7 shows cracks 602 consistently appear at ΔR=0 (shown as filled markers a and b) ahead of the drying front (shaded regions 730, 740); the data points are an aggregate of 10 layers that each develop a crack and the solid lines are moving averages. FIG. 7 also shows that the same contraction and expansion crack behavior occurs when measured during construction as a function of layer's distance below the bottom of the liquid bridge z (i.e., points a), and at termination as a function of time (i.e., points b).

The results shown in FIG. 7 were confirmed by electron and x-ray imaging, which indicated that the particles are close-packed at the surface and throughout the volume of the colloidal solids 601. This indicates that initially where ΔR>0 there is space between the particles, which is estimated to be on order of a few percent of their radii a, and where ΔR<0 the particles are in contact and elastically compressed. The particle packing is typically polycrystalline with order ranging approximately between about 100.0 a to about 10 a, and the location and orientation of the crystalline patches bears no recognizable correlation to that of the cracks visible in, for example, FIGS. 6A-6D.

Figure 8:
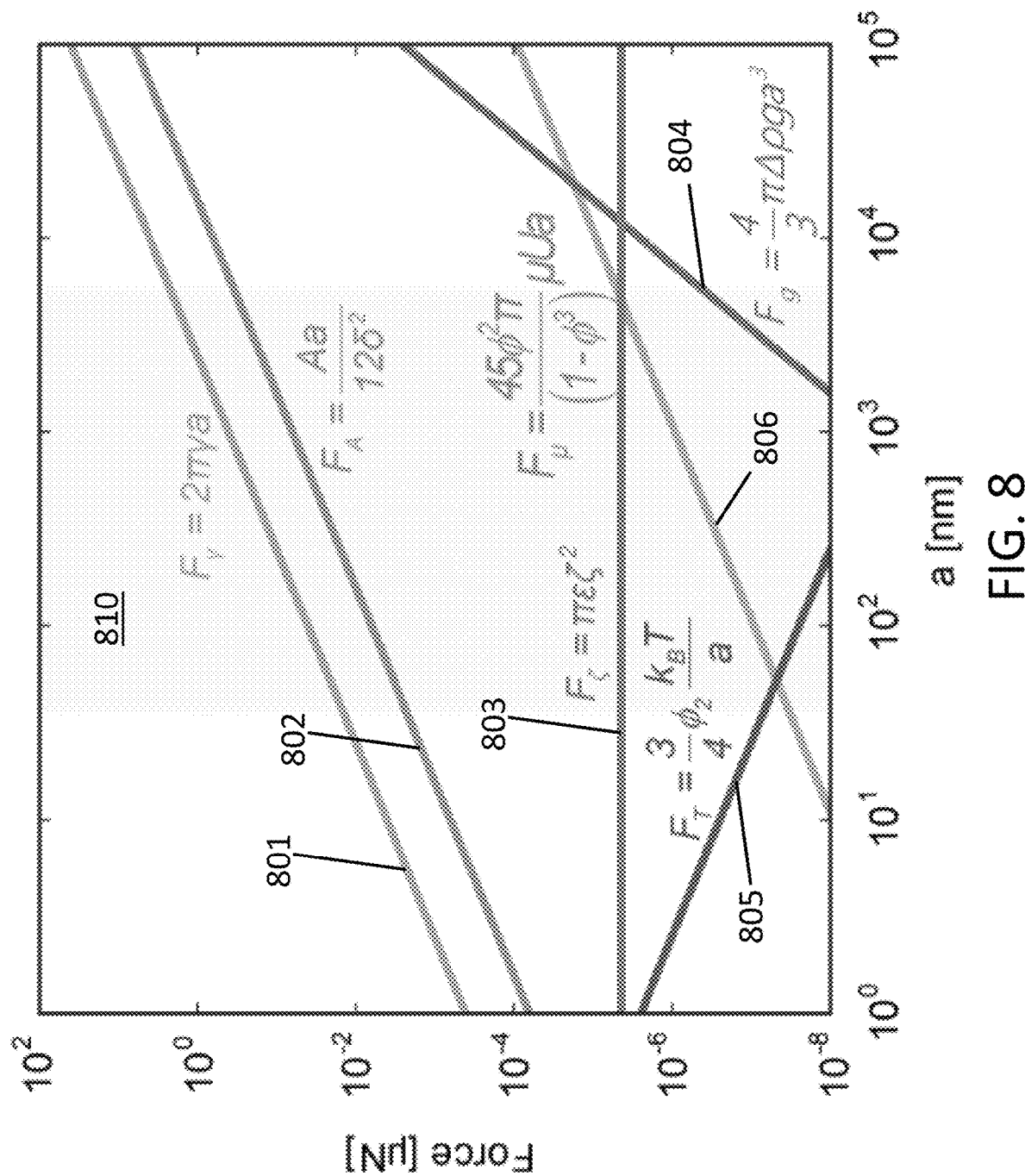
FIG. 8 is a plot illustrating a magnitude of physical forces exerted on colloidal particles that form a colloidal solid produced using a fabrication system like that of FIG. 1A.

Accordingly, in some instances, the moment when cracks appear, i.e., ΔR=0, corresponds to the particles approximately coming into contact with one another. At this instant, it is estimated that surface tension forces $F_\gamma \sim 2\pi\gamma a$ dominate the other forces exerted on the particles, namely the viscous $$F_\mu \sim \frac{\pi 45\phi^2}{(1-\phi)^3}\mu U a,$$

gravitational $$F_g \sim \frac{4\pi}{3}\rho_\Delta g a^3,$$

electrostatic $F_\zeta \sim \pi\epsilon\zeta^2$, Van der Waals $$F_A \sim \frac{Aa}{12\delta^2},$$

and thermal $$F_T \sim \frac{3\phi k_B T}{4a},$$

by at least an order of magnitude, as shown in FIG. 8.

Within the section of a colloidal solid 602 with height l that develops a crack 602, the particles approximately contact one another and FIG. 8 is a graph, plotted as a function of particle radius, of the characteristic forces experienced by the particles, a, at the instant the rack appears. FIG. 8 shows surface tension $F_\gamma$ (801), Van der Waals attraction $F_A$ (802), electrostatic double layer repulsion $F_\zeta$ (803), gravitational $F_g$ (804), thermal (i.e., osmotic) $F_T$ (805), and the force provided by flow of liquid (806). Note that the force of the liquid 806 overtakes the force of electrostatic double layer repulsion 803 below a particle size of about 10 μm, and the combined forces of the liquid 806 gravity overtakes the force of electrostatic double layer repulsion 803 well below a particle size of about 10 μm. The grey shaded region 810 corresponds to the range of particle sizes approximately in the range of about 44 nm to about 3 μm.

Estimates of the quantities in the above approximate formulas of FIG. 8 are: water surface tension $\gamma \approx 65$ mN/m (at 70 C); dynamic viscosity $\mu \approx 0.4$ mPa·s; water velocity $U \sim 10^{-3}$ mm/s (estimated from dispensing rates); density difference $\rho_\Delta = \rho_{polystyrene} - \rho_{water} \approx 40$ kg/m$^3$; gravitational acceleration g=9.8 m/s$^2$; dielectric constant of water $\epsilon \approx 63\epsilon_0$ (at 70 C); zeta potential $\zeta \approx 50$ mV (measured at room temperature); Hamaker constant $A \approx 1.4 \times 10^{-20}$ J; molecular space between contacting particles $\delta \sim 10^{-1}$ nm; particle volume fraction in the structure $\phi \approx 0.7$; temperature T=70 C, and Boltzmann constant $k_B = 1.38 \times 10^{-23}$ J/K. Notably, FIG. 8 was produced using polystyrene to produce the colloidal solid, and thus a person skilled in the art will recognize variables such as the Hamaker constant A (for $F_A$), zeta potential $\zeta$ (for $F_\zeta$), and density difference $\Delta\rho$ (for $F_g$) may have different values for a different material. As a result, the graph for a different material may be similar, or even akin, to the graph of FIG. 8 for polystyrene, with lines shifted accordingly based on the different values for the different material.

Accordingly, a criterion was developed for predicting crack initiation that involves only the dominant energy quantities related to surface tension. Consider the cylindrical section of the wet structure with height l and radius constricted to≈R, as depicted in FIG. 6A, just before it initiates a crack 602. At this order of approximation, the section comprises particles that are approximately in contact and saturated in stationary water at uniform pressure difference $P_l$ from atmosphere due to the microscopic water menisci wetting the particles at the outer surface of the section; the surface energies $\gamma$, $\gamma_{ap}$, $\gamma_{lp}$ correspond respectively to surface areas $A_{la}$, $A_{ap}$, $A_{tp}$.

Additionally, the particles form a porous elastic network that is subject to a compressive pressure $P_n$ due to the capillary pressure of the water, and evaporation is treated simply as the removal of liquid at constant temperature.

In a differential time interval, a differential volume of water $dV_l$ can evaporate from the outer surface of the cylindrical section and, in turn, can compress the particle network, and can deform and recede the water menisci between the particles so that the differential change in free energy for the cylindrical section is $dF=-P_l dV_l - P_n dV_n + \gamma dA_{la} + \gamma_{lp} dA_{lp} + \gamma_{ap} dA_{ap} = -P_l dV_l - P_n dV_n + \gamma(dA_{lc} + \cos\theta dA_{ap})$. This can be simplified using Young's law $\gamma_{ap} - \gamma_{lp} = \gamma \cos\theta$, which defines the contact angle θ, and recognizing that $dA_{ap} = dA_{lp} > 0$ because the water may recede to expose more air-particle surface at the expense of liquid-particle surface. If it supposed that the section is in equilibrium and no crack initiates, then all the energy quantities are conservative and $dF = -P_l dV_l - P_n dV_n + \gamma(dA_{la} + \cos\theta dA_{ap}) = 0$. The interpretation here is that the energy released from the section by the evaporated liquid volume, i.e., $-P_l dV_l < 0$ because $dV_l < 0$ and $P_l < 0$, is equal to the sum of energy acquired by compressing the particle network and creating surface area by deforming and receding the menisci between the particles.

The following scaling of terms recasts dF into a simpler expression. The cylindrical section has a surface area $A = 2\pi R l$ and the total number of particles on the surface of the section $N \sim A/a^2$. Changes $dV_l$, $dV_n$, $dA_{la}$, $dA_{ap}$ occur concurrently in the differential window of time, so these quantities can be parameterized by the same dimensionless variable, $\xi$. The pressure differences scale as $P_l \sim -P_n \sim -\gamma/a$ because the liquid is below atmospheric pressure and the particle network experiences positive compression. Around each particle on the surface of the section, an evaporated volume can be represented as $dV_a \sim a^3 d\xi$ and changes in surface area quantities as $dA_a \sim a^2 d\xi$. This gives $dV_l = NdV_a \sim -A_l a d\xi$ and $dA, dA_{ap} \sim NdA_a \sim A_l d\xi$. The compression of the particle network can also have the same scaling $dV_n \sim dV_l \sim -A_l a d\xi$ because the water that fills the particle network can be incompressible. For each term comprising dF, these scalings can be substituted and the appropriate positive coefficients $c_i$ can be introduced, which gives $P_l dV_l = -c_l \gamma A d\xi$, $-P_n dV_n = -c_n \gamma A d\xi$, and $\gamma(dA_{la} + \cos\theta dA_{ap})d\xi = c_\gamma \gamma A d\xi$. The coefficients $c_i$ are functions of geometry, $\theta$, and the elasticity of the particle network. These dominant energy quantities can all have the same scaling, and therefore $dF = (-c_l + c_n + c_\gamma)\gamma A d\xi$. For $dF = 0$, $(-c_l + c_n + c_\gamma)\gamma A = 0$, or $(c_n + c_\gamma)/c_l = 1$ regardless of the details of the particular parameterization $\xi$.

The energy barrier to initiate a crack can be on the order of the work required to wet or dewet a particle of radius a from the outer surface of the cylindrical section, which may be written as $c_\delta \gamma a^2$. It can be energetically favorable for a crack to initiate and propagate provided dF<0 with the energy barrier for crack initiation included, i.e., $(-c_l + c_n + c_\gamma) \gamma A + c_\delta \gamma a^2 < 0$. Succinctly, the section cracks when satisfying:

$$\frac{a^2}{Rl} < g \quad \text{(Equation 2)}$$

where $g \equiv 2\pi(c_l - c_n - c_\gamma)/c_\delta$ is a non-negative dimensionless constant. According to Equation 2, for a given particle size a, cracks will appear if the surface area of the section (i.e., $A = 2\pi R l$) is made large enough, and the limiting case $g \to 0$ corresponds to $(c_n + c_\gamma)/c_l \to 1$, for which cracking is impossible as described in the previous paragraph. Conversely, for a given particle size, the section may be crack free provided its surface area is sufficiently small. The result is a ratio of length scales due to having only considered the dominant energy terms, which have similar scalings related to wetting energy.

Figure 9A:
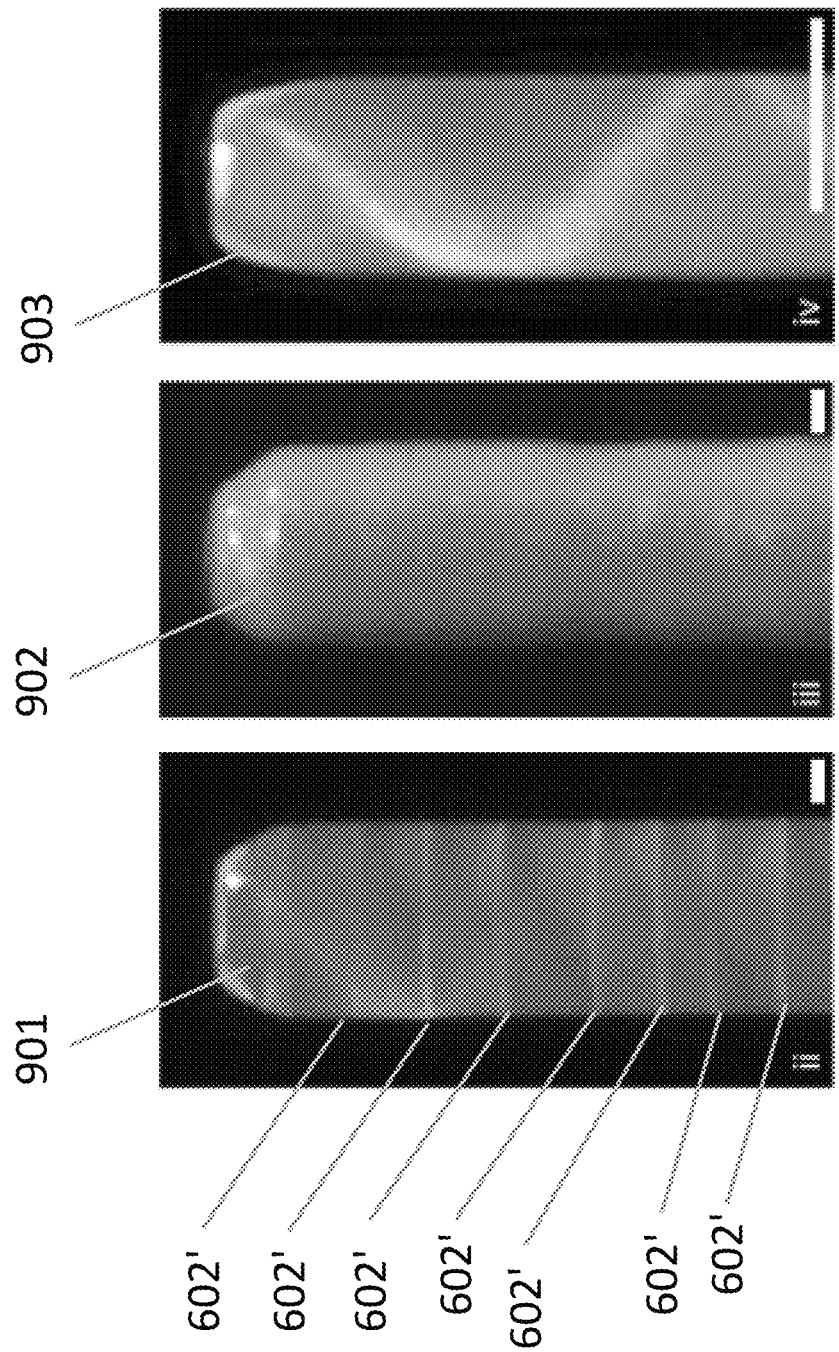
FIG. 9A provides photographs of three colloidal solids, each exhibiting crack formations therein.
Figure 9B:
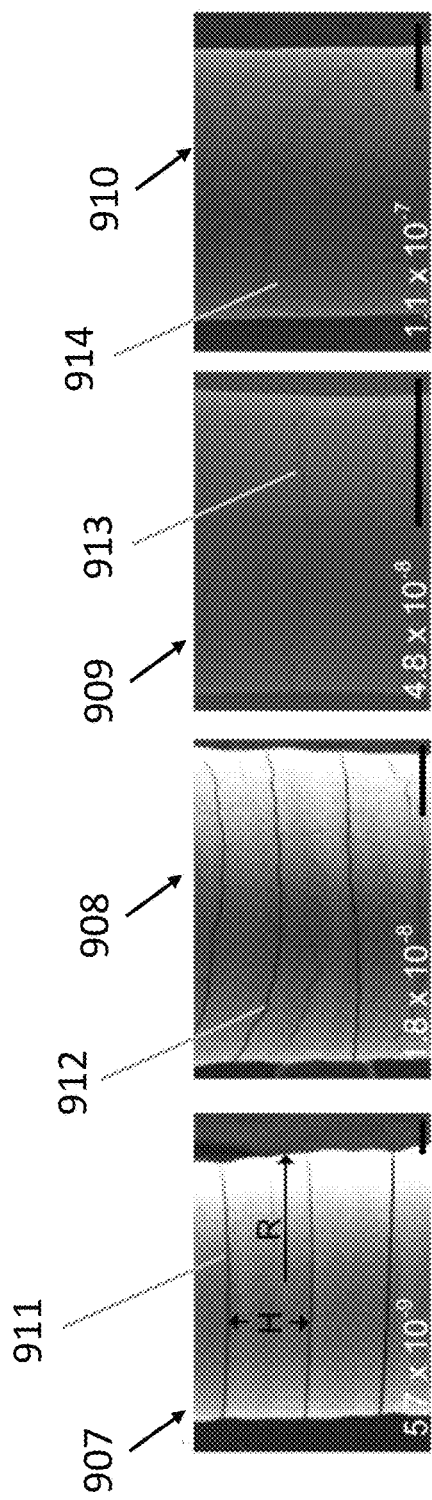
FIG. 9B illustrates SEM images of particle structures of four different colloidal solids, depending on their particle sizes, exhibiting wide circumferential cracks, as well as a variety of arbitrary crack patterns.

FIG. 9A shows photographs of three colloidal solids exhibiting crack formations. A first colloidal solid 901 exhibits wide circumferential cracks 602', a second colloidal solid 902 exhibits shallower cracks in arbitrary orientations, and a third colloidal 903 exhibits no cracks, where the structure internally reflects the illumination incident from the top right. FIG. 9B shows SEM images 907, 908, 909, 910 of the particle structures of four different colloidal solids exhibiting wide circumferential cracks 911, 912, as shown in the images 907 and 908, respectively, as well as a variety of arbitrary crack patterns 913, 914, as shown in the images 909 and 910, respectively, such cracking being dependent on their particle size. The values displayed on each SEM image 907, 908, 909, 910 are the values of $a^2/Rl$, and thus the values are $5.7 \times 10^{-9}$ for the SEM image 907, $1.8 \times 10^{-8}$ for the SEM image 908, $4.8 \times 10^{-8}$ for the SEM image 909, and $1.1 \times 10^{-7}$ for the SEM image 910.

Based on the observations of FIGS. 9A and 9B, and similar experiments, a comparison is made between Equation 2 and the experiment, considering a cylindrical section with height l that corresponds to the wet section of the particle structure with its radius constricted to $\approx R$, as shown in FIGS. 6A-6D. During construction l comprises only a portion of the wet solid (as shown in FIG. 6A), while at termination l is approximately the entire wet solid (as shown in FIGS. 6B-6D). Accordingly, if Equation 2 is only satisfied at termination, then cracks may only appear at the top of the structure. For the structures shown in FIGS. 6A and 6B, and all others tested, $a^2/Rl$ was calculated at termination and it was determined that $a^2/Rl \approx 10^{-7}$ demarcates those with and without cracks of any kind after drying as shown in FIG. 9C.

Figure 9C:
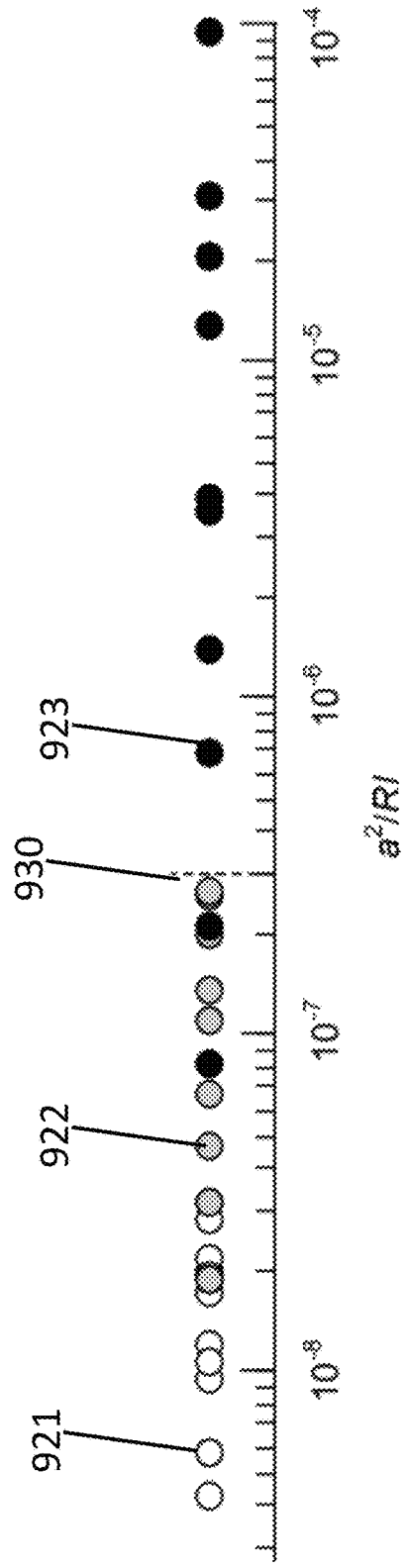
FIG. 9C is a graph of a plurality of experimental observations related to cracking, where the type of the cracks presented was evaluated and plotted against an equation for use in predicting cracking in colloidal solids.

FIG. 9C is a graph of $a^2/Rl$ (i.e., Equation 2), along with a plurality of experimental observations, as represented by FIG. 9B, where the quality of the cracks presented was evaluated and plotted against Equation 2. In FIG. 9C, the white dots 921 represent colloidal solids 901 produced with circumferential cracks, the gray dots 922 represent colloidal solids 902 produced with arbitrary oriented cracks, and the black dots 923 represent colloidal solids 903 produced with no cracks. For the subset 921 of colloidal solids 901 produced with circumferential cracks, the sections of the structure with radius R and height H (as shown on colloidal solid 911 of FIG. 9B) in between the cracks does not satisfy Equation 2, and therefore provides an upper estimate for g. For these sections, $a^2 \approx gRH$, and therefore g is approximately $3 \times 10^{-7}$, indicated by a dotted line 930 in FIG. 9C, as shown in more detail in FIG. 9D.

Figure 9D:
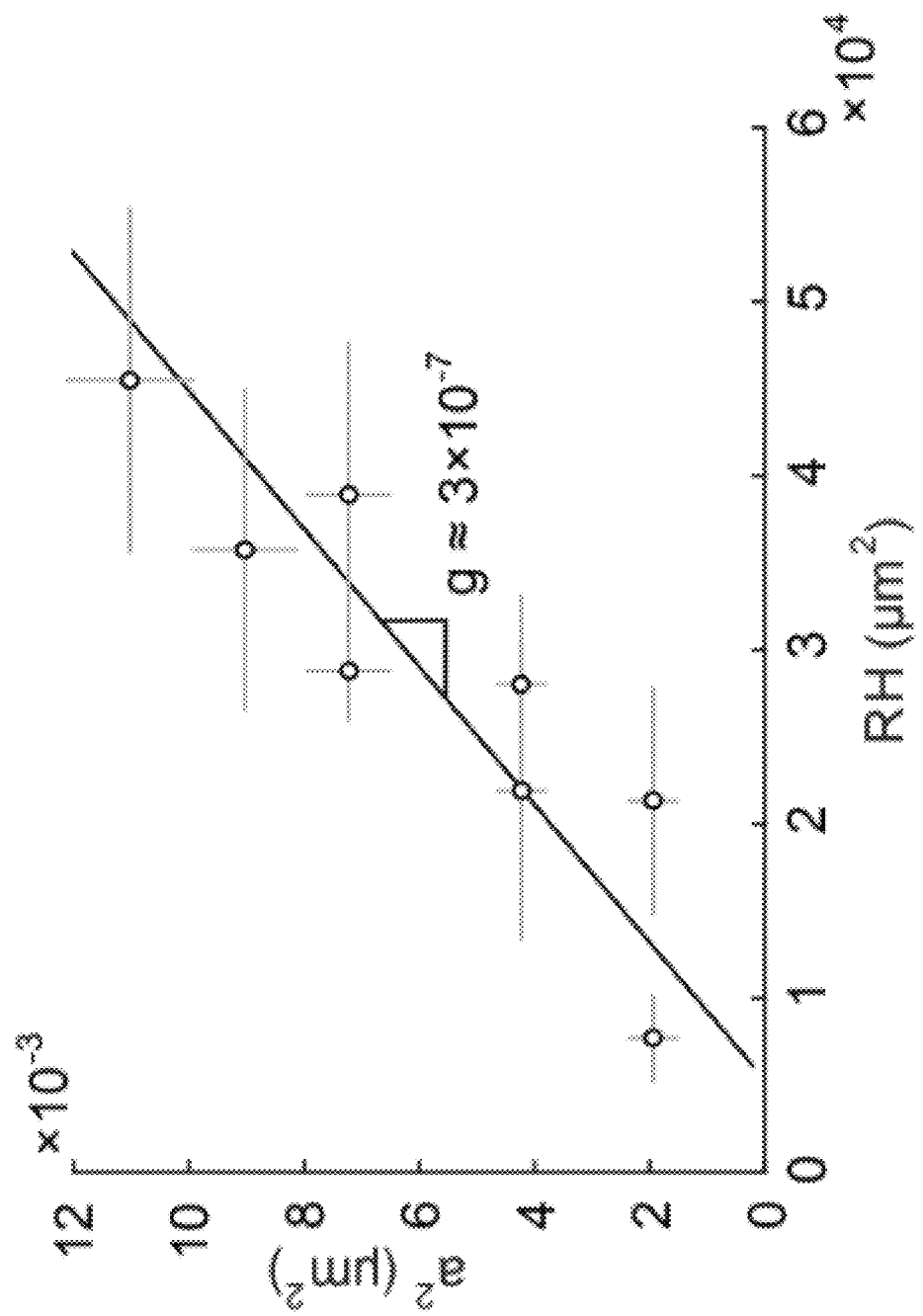
FIG. 9D is a graph of measurements of spacing between circumferential cracks in a colloidal solid and represents an upper estimate on parameters for use in determining the onset of cracking, which can be used in conjunction with exemplary methods and systems provided herein for fabricating a colloidal solid.

FIG. 9D is a graph of measurements of the spacing H between circumferential cracks 911 (as shown in FIG. 9B) and represents an upper estimate on $a^2/Rl$ for the onset of cracking. The measurements of H were taken only from the top parts of the solids where the cracks formed at termination throughout the wet sections in order to guarantee an approximate upper estimate of g.

The spacing of the cracks can clearly be seen changing in accordance with Equation 2 in FIG. 9A by comparing the visible cracks 602 in the first colloidal solid 901 to the microscopic cracking present in the second colloidal solid 902. Because an approximately constant value for g can be identified, it indicates that the assumption of considering only the dominant energy quantities related to surface tension is an appropriate simplification for the range of structure and particle sizes considered suitable for use with aspects of the present disclosure.

Accordingly, considering only the dominant energy terms related to surface tension is sufficient to develop a criterion for crack initiation that agrees with experiment and provides the practical intuition required for constructing crack-free structures. In certain aspects, Equation 2 is valid for other material combinations of colloid particles and liquid provided that wetting energy terms dominate at the instant of crack initiation, however the value for g may in general be different. Moreover, $a^2/Rl$ is essentially the ratio of the surface area of the particle over the surface area of the wet section of the structure; by replacing $a^2/Rl$ with this surface area ratio, the validity of Equation 2 can be extended to particles and structures of different shapes.

Example Commercial Applications

Aspects of the present disclosure broadly permit additive manufacturing of colloidal solids for optical, thermal, mechanical, and other applications. In particular, direct-write assembly can create functional photonic structures with optical filtering, emission, and waveguiding properties.

Figure 10:
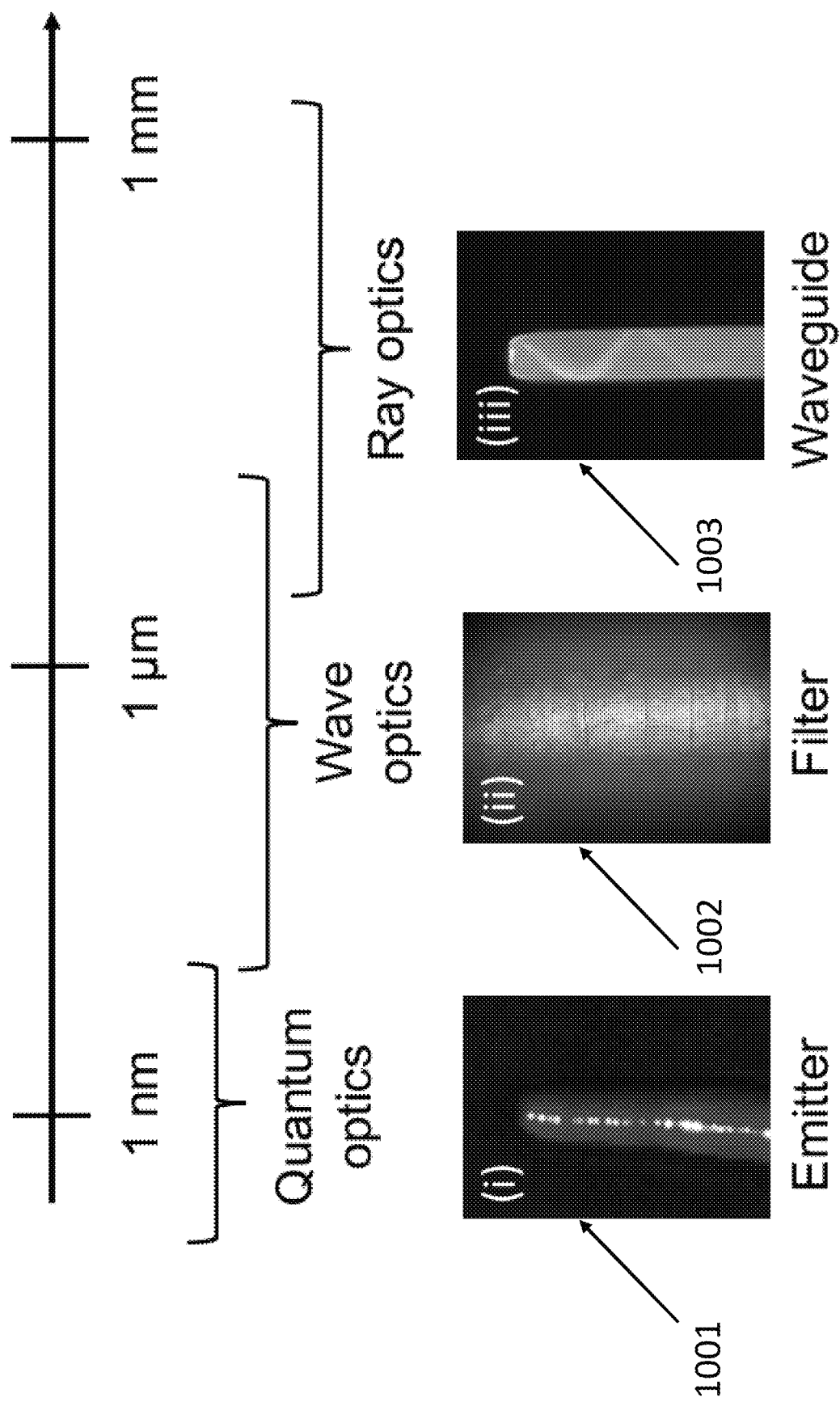
FIG. 10 illustrates three photonic applications of a direct-write assembly across different length scales, including quantum optics, wave optics, and ray optics, the direct-write assembly being performed in view of the exemplary methods and systems provided herein for fabricating a colloidal solid.

Photonic devices may be used for applications as diverse as chemical or biological sensing, data communication, and optical computing. FIG. 10 shows a few examples of structures that perform elementary functions of emission, filtering, and waveguiding by harnessing optical phenomena across different length scales, including quantum optics, wave optics, and ray optics. As shown, FIG. 10 provides three non-limiting photonic applications of direct-write assembly across different length scales, from quantum optics, to wave optics, to ray optics: a photoluminescent emitter 1001 assembled from core-shell quantum dots; a reflective filter 1002 assembled from approximately 220 nm polystyrene particles; and a waveguide 1003 assembled from approximately 88 nm polystyrene particles.

A quantum dot structure 1001 is an example of a direct-write assembly used in conjunction with quantum optics, assembled using commercially available quantum dot particles approximately in the range of about 5.5 nm to about 6.5 nm in diameter. The quantum dots can have a $CdS_xSe_{1-x}/ZnS$ core/shell structure and can be capable of photoluminescence, a quantum optical phenomenon relevant to applications such as energy efficient lighting and displays. When illuminated with UV light, the quantum dot structure 1001 emitted red light. Other light colors may be possible.

Aspects of the present disclosure include colloidal solids as optical filters which use the principle of Bragg reflection. FIG. 10 shows the surface of a colloid structure comprising particles of approximately 220 nm, which reflects green light, creating a filter structure 1002. The range of wavelengths, and thus colors, reflected by the colloidal solid can be tuned by particle size. Filter structure 1002 is an example of direct-write assembly used in conjunction with wave optics. Bragg reflection is a wave optic phenomenon in which interference of light occurs by reflection from ordered lattice planes, resulting in wavelength-specific reflection. The range of reflected wavelengths is the photonic stopband. Therefore, a Bragg reflector may be thought of as a photonic analog to an electronic stop-band filter.

Aspects of the present disclosure include direct-write assembly used in conjunction with ray optics. FIG. 10 shows an optical waveguide 1003 created using direct-write assembly. A key requirement for miniature photonic platforms is for different subunits, such as filters, emitters, and detectors, to be interconnected. In previous works, defects in photonic crystals have been used to manipulate wave optics to guide light within thin dielectric films. In these cases, a linear defect in the crystal has to be patterned using techniques such as multi-photon polymerization. In contrast, aspects of the present disclosure include utilizing the direct-write assembly to directly fabricate a waveguide that uses refractive ray optics rather than diffractive wave optics to guide light. Fabrication of a waveguide in this manner is attractive because of the potential to directly write, in three-dimensional space, the desired path for guiding photons.

The optical waveguide 1003 was constructed as a freestanding structure that was about 80 µm in diameter with about 44 nm particles. The particle size was chosen to be much smaller than the visible wavelengths of light so as to prevent diffraction in the visible wavelengths. Nevertheless, the structure has an overall bluish color due to Rayleigh scattering. In FIG. 10, the optical waveguide 1003 is illuminated from the top right by a white light source, and a ray of light within the structure is visible. Due to the mismatch in refractive index between air and the colloidal crystal, the ray undergoes multiple total internal reflections, indicating potential use of the colloidal solid as an optical waveguide similar to an optic fiber. As with the other colloidal solids, other colors can be achieved with the optical waveguide 1003.

Figure 11:
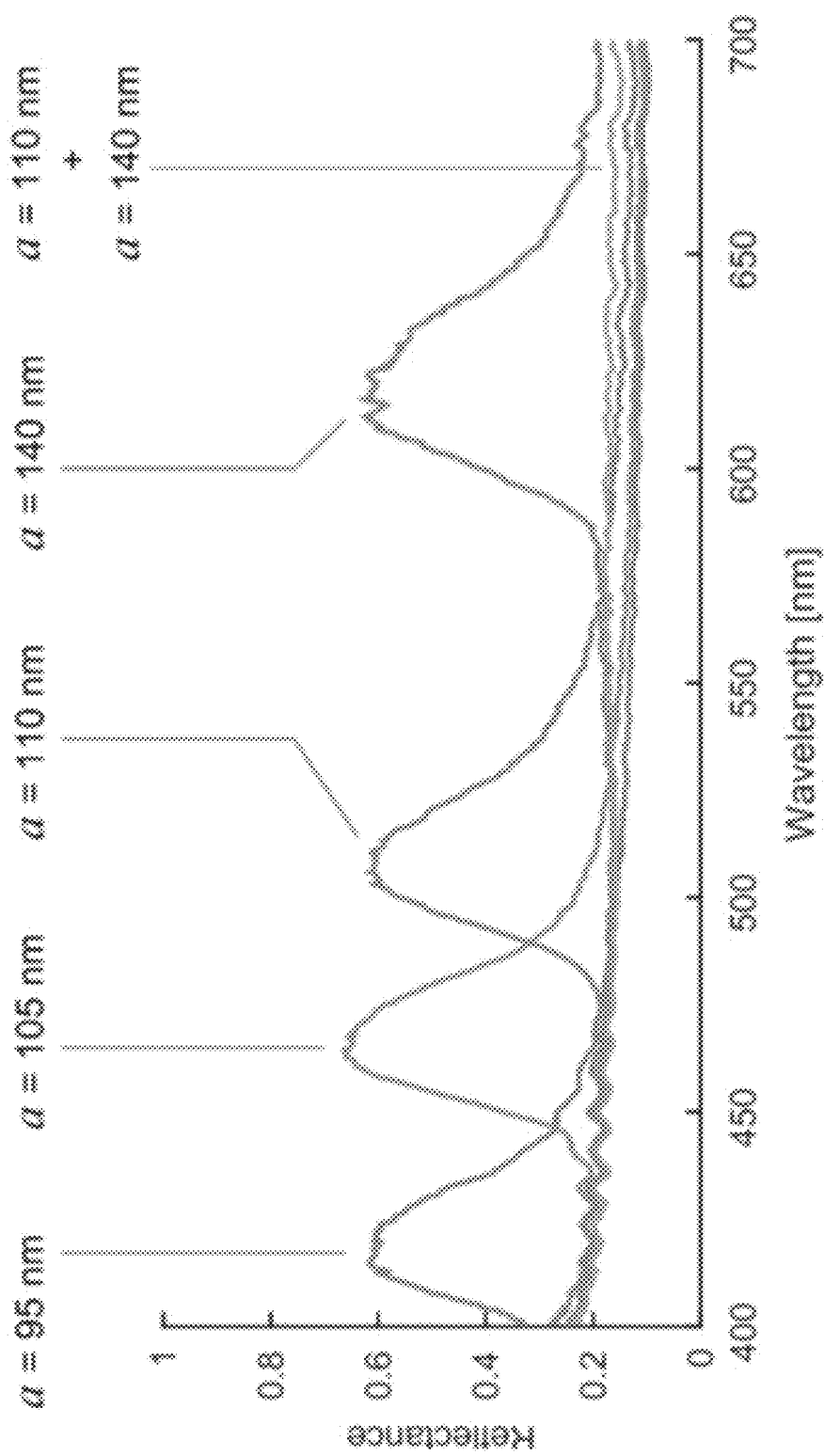
FIG. 11 is a graph of a reflectance of colloidal solids of different particle sizes based on a wavelength, the colloidal solids being fabricated using the exemplary methods and systems provided herein for fabricating a colloidal solid.

FIG. 11 is a graph of the reflectance of colloidal solids of different particle sizes. The reflectance properties of freeform colloidal solids can be tailored by a choice of particle size, build trajectory, and material. FIG. 11 shows measurements of freestanding cylindrical colloidal crystals with structural colors tunable by the radius of polystyrene particles (increasing from left to right), and corresponding reflectance spectra measured from the surface of each of the above structures.

Colloidal assemblies exhibit a diverse range of optical phenomena depending on their crystalline order. Well-ordered colloidal crystals are known to have photonic stopbands that enable the spectrally-selective reflection of light, which gives a sparkling, iridescent appearance. The spectral position of the stopband mainly depends on the particle size and packing. Conversely, amorphous colloidal solids made by frustrating the assembly process can exhibit non-iridescent structural colors, and the building blocks can be chosen to exploit absorption and interference effects synergistically. Such ordered and disordered materials can form the basis for lasers, optical sensors, waveguides, and structural color displays.

Aspects of the present disclosure provide for building macroscale colloidal solids with tailored optical properties, such as by selecting the particle size and controlling the packing within the structures. The ordered crystalline arrangements observed in the interior of the fabricated colloidal solids suggest that they exhibit structural coloration due to Bragg reflection occurring in the visible range of light. Structures made from monodisperse particles of different size should therefore reflect different colors when illuminated with white light. Upon white light illumination, colloidal solids formed from particles of radius a~equal to about 95 nm, about 105 nm, about 110 nm, and about 140 nm appear violet, blue, green, and red, respectively, as shown in FIG. 11.

In FIG. 11, reflectance spectroscopy reveals that the colloidal solids exhibit Bragg reflection peaks at λ~equal to about 420 nm, about 460 nm, about 510 nm, and about 620 nm, respectively. In colloidal solids built from suspension with mixed particle sizes (here, an equal proportion of a~equal to about 110 nm and a~equal to about 140 nm particles), the slight mismatch in particle size leads to frustrated particle packing and no long-range order. Therefore, under white light illumination in an optical microscope, the mixed-particle colloidal solids appear whitish and reflectance spectroscopy shows that all visible wavelengths have been reflected at a uniform level of ~0.2. The emergence of structural colors from ordered assemblies of particles, and the tuning of particle size to modify the spectral position of the reflectance peak, is demonstrated in complex, macroscale shapes via direct-write colloidal assembly.

Figure 12B:
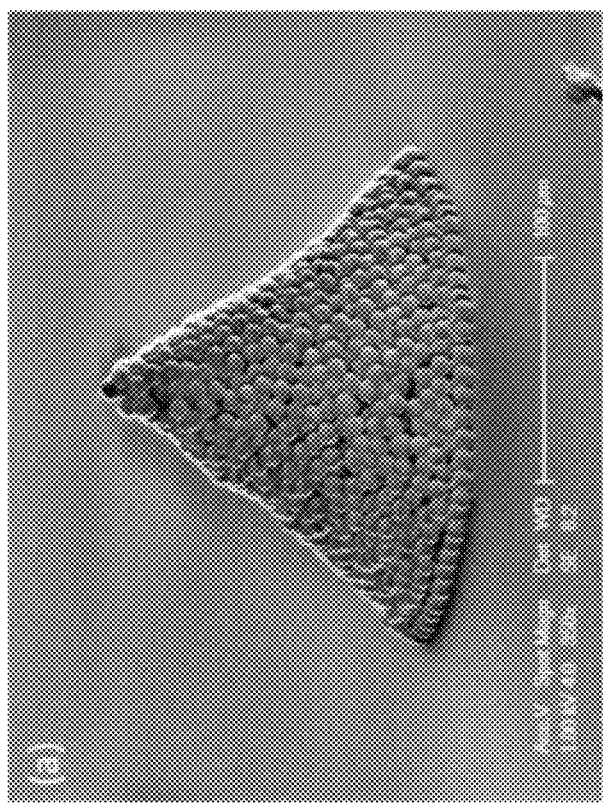
FIGS. 12A and 12B are SEM images of a colloidal solid before and after heating, respectively.
Figure 12A:
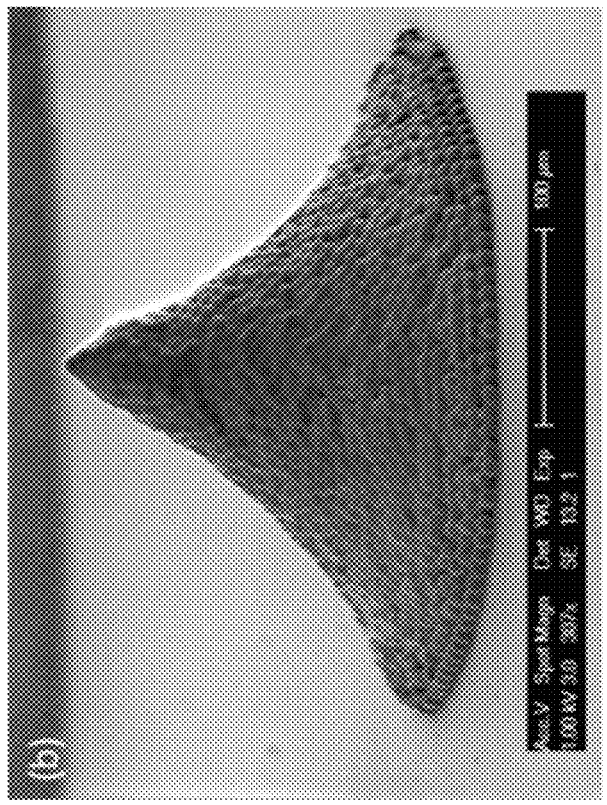

FIGS. 12A and 12B are SEM images of a colloidal solid before and after heating. FIG. 12B shows a colloidal solid having particles fused together by post-processing techniques, including but not limited to post-process heating and/or by in situ laser heating. This post-process sing step may serve to increase mechanical strength of the colloidal solid, or modify its electrical, chemical, and/or optical

What is claimed is:

1. A method of fabricating a colloidal solid, comprising:
dispensing a colloidal particle suspension through an orifice of a dispensing component, towards a substrate, so as to establish and maintain a liquid bridge at the orifice of the dispensing component and precipitate a wet section of a colloidal solid from a base of the liquid bridge, the liquid bridge extending between the dispensing component and one of the substrate or a precipitating portion of the wet section of the colloidal solid, the colloidal particle suspension comprising a liquid and colloidal particles;
maintaining continuous precipitation of colloidal particles in the liquid bridge to form a length of the wet section of the colloidal solid;
removing at least a portion of the liquid from the dispensed colloidal particle suspension in a manner that causes the wet section of the colloidal solid to dry and establish a drying front that moves along the colloidal solid where the wet section transitions to a dry crystal structure, wherein the length of the wet section extends between the liquid bridge and the drying front; and
controlling a rate of the dispensing to maintain the presence of the length of the wet section as the drying front moves along the colloidal solid; and
controlling a rate at which the at least a portion of the liquid from the dispensed colloidal particle suspension is removed as a function of at least one of: one or more sizes of the colloidal particles; one or more dimensions of the wet section of the colloidal solid; geometry of the wet section of the colloidal solid; a temperature of the at least one of the substrate, a bounding surface located above the substrate, the bounding surface being opposed to the substrate, or an environment surrounding the dispensed colloidal particle suspension; a surface tension of the liquid; or a viscosity of the liquid,
wherein the controlling the rate at which the at least a portion of the liquid from the dispensed colloidal particle suspension is removed comprises preventing crack formation by controlling an evaporation rate of the liquid to maintain one or more dimensions of the wet section as a function of a ratio of the surface area of the colloidal particle to the surface area of the wet section of the colloidal solid.

2. The method of claim 1, further comprising:
moving the base of the liquid bridge in-plane, the base being in contact with the substrate, to form the colloidal solid on the substrate, the colloidal solid having an aspect ratio less than one; and
controlling at least one of movement of the base of the liquid bridge or a rate at which the colloidal particle suspension is dispensed to achieve a desired thickness of the colloidal solid.

3. The method of claim 1, further comprising moving the liquid bridge over one or more layers of previously deposited colloidal particles of the colloidal solid a plurality of times to deposit one or more additional layers of colloidal particles that become part of the colloidal solid, thereby increasing a thickness of the colloidal solid.

4. The method of claim 1, further comprising moving the liquid bridge with respect to the substrate to form the colloidal solid, the colloidal solid having an aspect ratio greater than one.

5. The method of claim 4, wherein the aspect ratio is greater than ten.

6. The method of claim 1, further comprising adjusting at least one of a distance between the orifice of the dispensing component and the colloidal solid or a rate at which the colloidal particle suspension is dispensed to maintain continuity of the liquid bridge.

7. The method of claim 6, wherein the rate at which the colloidal particle suspension is dispensed is approximately equal to an instantaneous rate at which the at least a portion of the liquid from the dispensed colloidal particle suspension is removed.

8. The method of claim 6, wherein a rate at which the distance between the orifice of the dispensing component and the colloidal solid is adjusted is approximately equal to a precipitation rate of the colloidal solid.

9. The method of claim 6, wherein adjusting a distance between the orifice of the dispensing component and the colloidal solid comprises at least one of: translating the dispensing component with respect to the substrate; rotating the dispensing component with respect to the substrate; translating the substrate with respect to the dispensing component; or rotating the substrate with respect to the dispensing component.

10. The method of claim 1, wherein removing at least a portion of the liquid from the dispensed colloidal particle suspension further comprises evaporating at least a portion of the liquid from the dispensed colloidal particle suspension.

11. The method of claim 10, wherein evaporating at least a portion of the liquid from the dispensed colloidal particle suspension further comprises heating at least one of the substrate, a bounding surface located above the substrate, the bounding surface being opposed to the substrate, or an environment surrounding the dispensed colloidal particle suspension.

12. The method of claim 11, further comprising controlling heating of the at least one of the substrate, the bounding surface, or the environment surrounding the dispensed colloidal particle suspension to maintain a spatially controlled temperature throughout the colloidal solid during the evaporating of the liquid.

13. The method of claim 1, wherein removing at least a portion of the liquid from the dispensed colloidal particle suspension further comprises at least one of wicking at least a portion of the liquid from the dispensed colloidal particle suspension into the substrate or diffusing at least a portion of the liquid from the dispensed colloidal particle suspension into an ambient medium.

14. The method of claim 1, further comprising collapsing the liquid bridge to terminate precipitation of the colloidal solid.

15. The method of claim 1, further comprising:
sensing a configuration of the liquid bridge; and
in view of the sensed configuration of the liquid bridge, adjusting at least one of the following to maintain the liquid bridge as continuous: a rate at which the colloidal particle suspension is dispensed; or a location of the substrate with respect to the orifice of the dispensing component.

16. The method of claim 15, wherein the sensing comprises measuring a pressure of the colloidal suspension upstream of the orifice.

17. The method of claim 15, wherein the sensing comprises imaging the liquid bridge.

18. A method of fabricating a colloidal solid, comprising:
dispensing a colloidal particle suspension through an orifice, towards a substrate, so as to establish a liquid bridge at the orifice and precipitate a wet section of a colloidal solid from a base of the liquid bridge, the liquid bridge extending between the orifice and one of the substrate or a precipitating portion of the wet section of the colloidal solid, the colloidal particle suspension comprising a liquid and colloidal particles;
removing at least a portion of the liquid from the dispensed colloidal particle suspension in a manner that exerts a compressive force on the colloidal particles sufficient to assemble them into the wet section of the colloidal solid by overcoming one or more electrical repulsion forces between the colloidal particles, the removing forming a drying front that moves along a length of the colloidal solid where the wet section transitions to a dry crystal structure;
controlling a rate of the dispensing to adjust a crystallinity of the dry crystal structure,
wherein the colloidal particles are of a sufficiently small size such that the one or more electrical repulsion forces between the colloidal particles at the base of the liquid bridge is greater than gravitational sedimentary forces between the colloidal particles.

19. The method of claim 18, wherein removing the liquid to exert the compressive force occurs over a length of time sufficient to permit at least a portion of particles of the colloidal solid to settle into a crystal arrangement.

\* \* \* \* \*